INVENTORS.
Gerald T. Moore
Ernst Herzberg
Herbert P. Grossimon
By Wolfe, Hubbard, Voit & Osann
Attys.

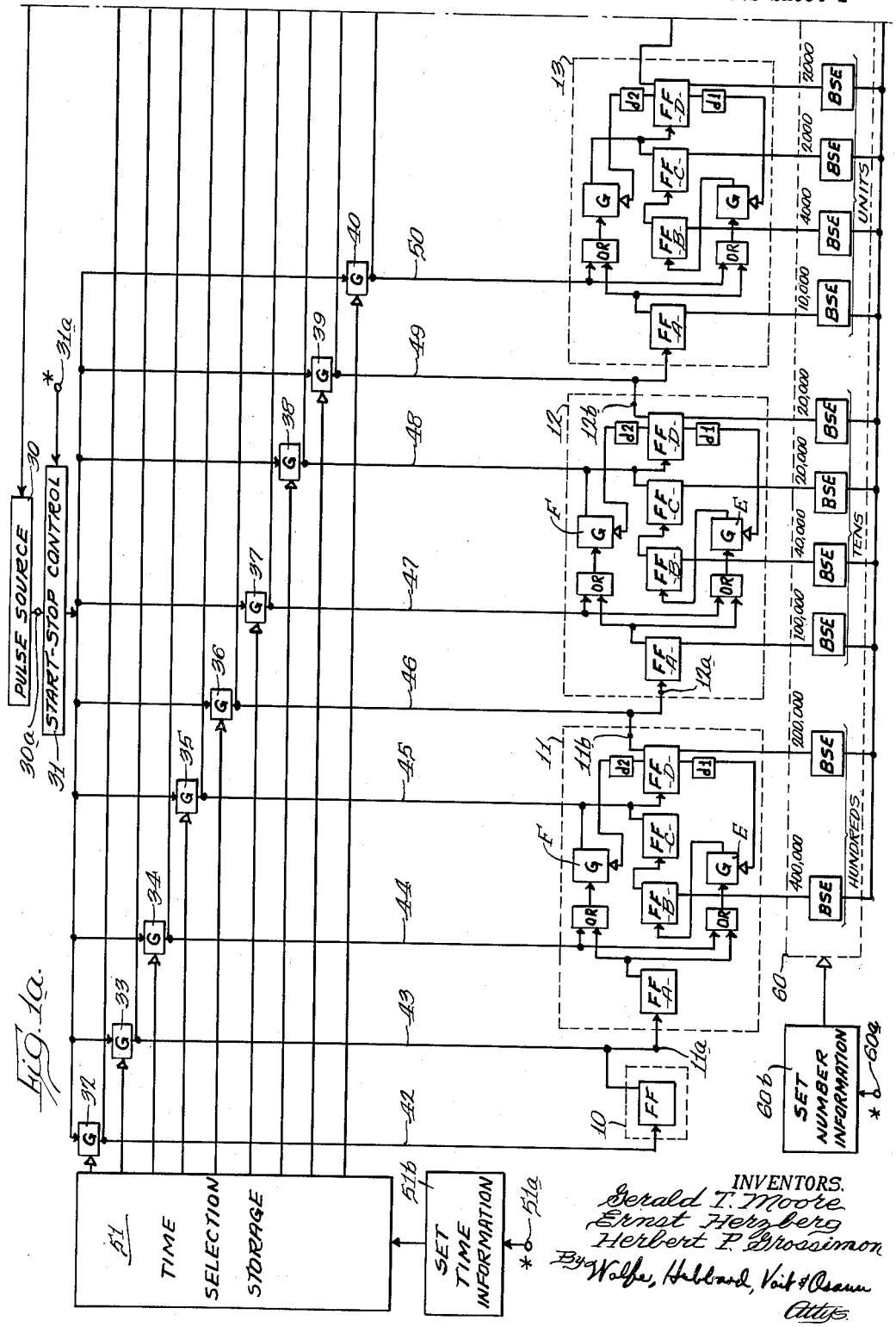

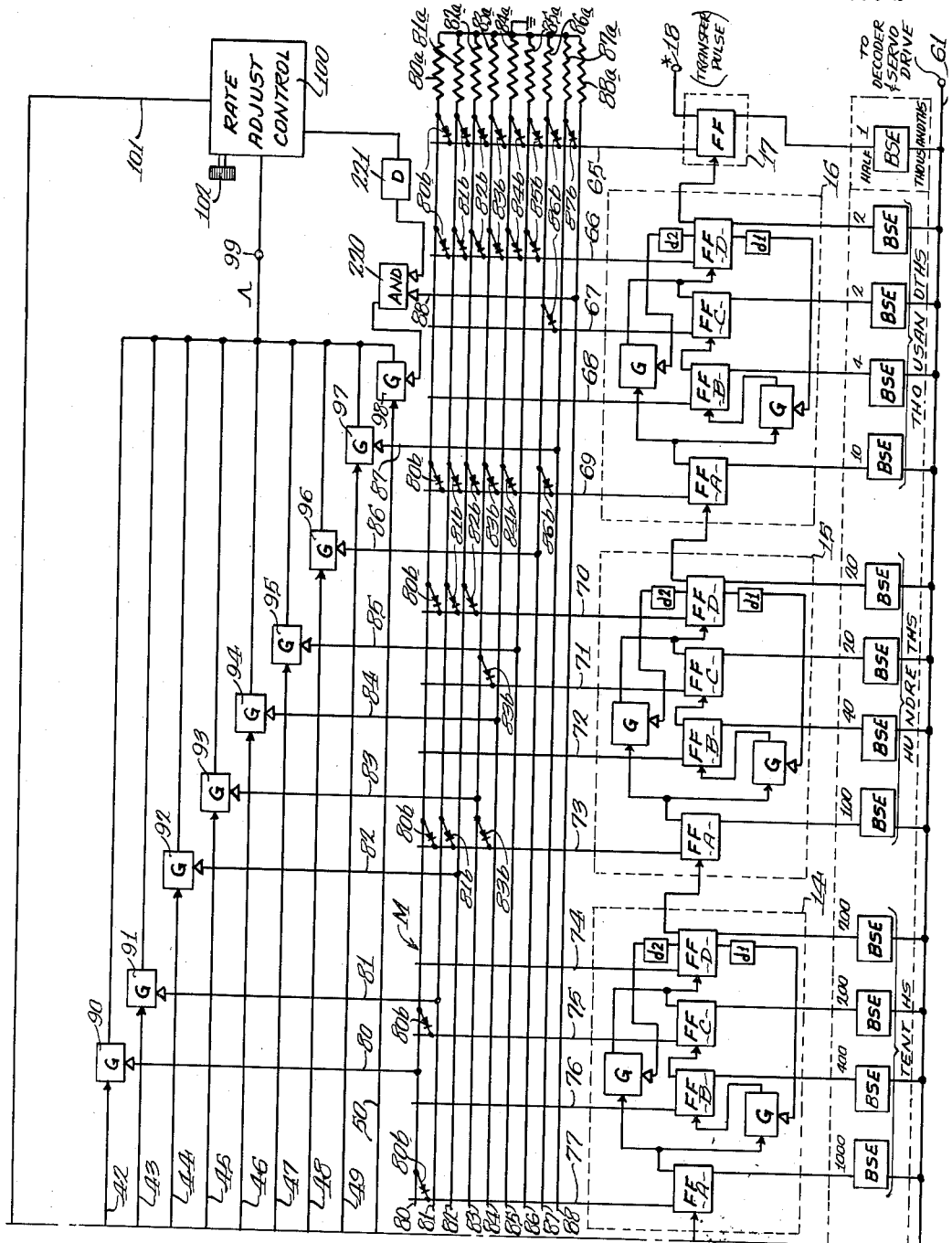

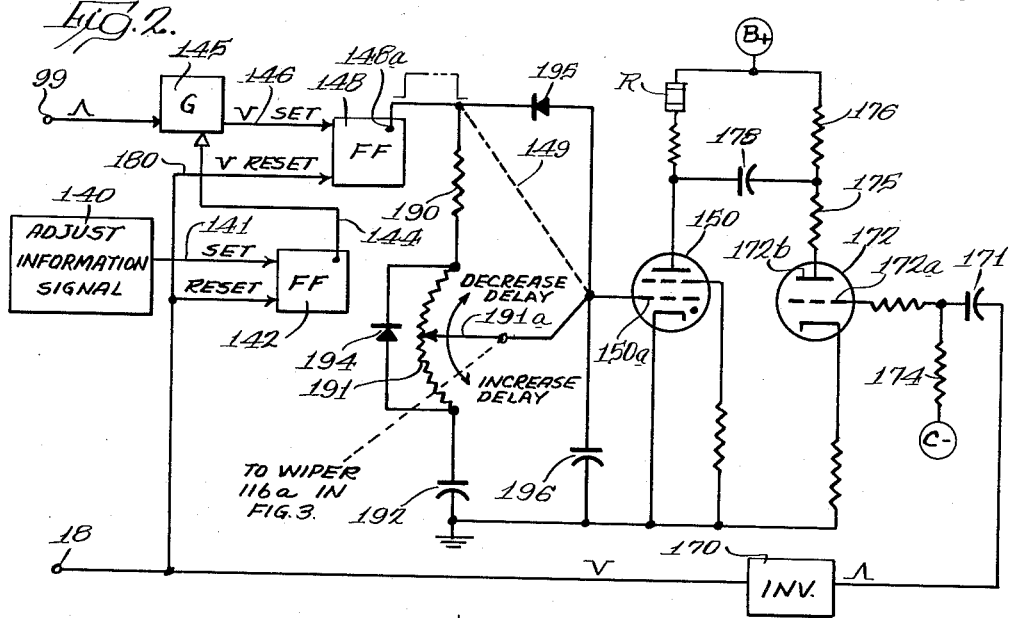
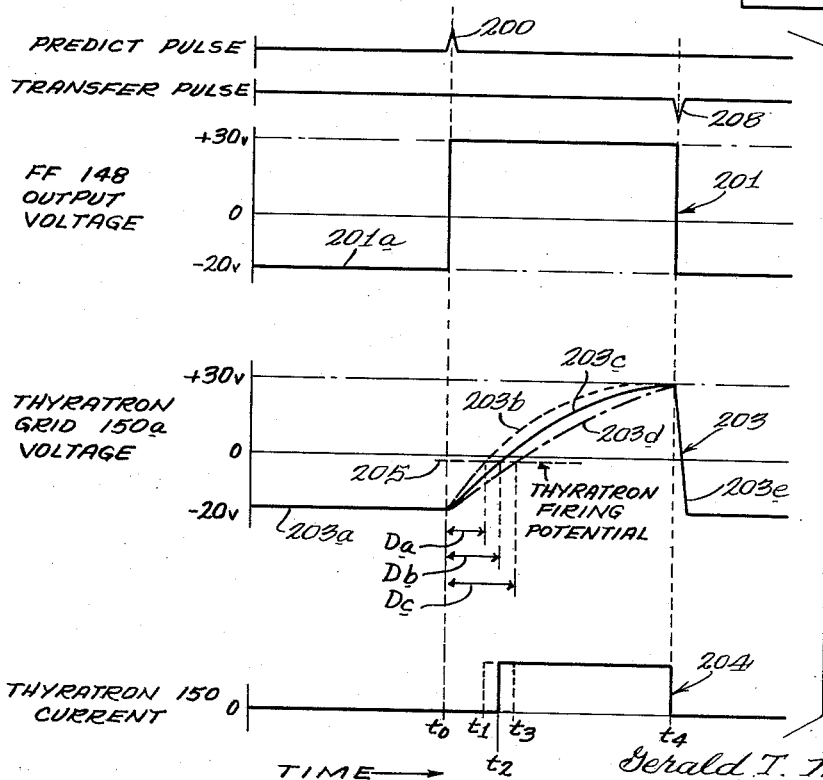

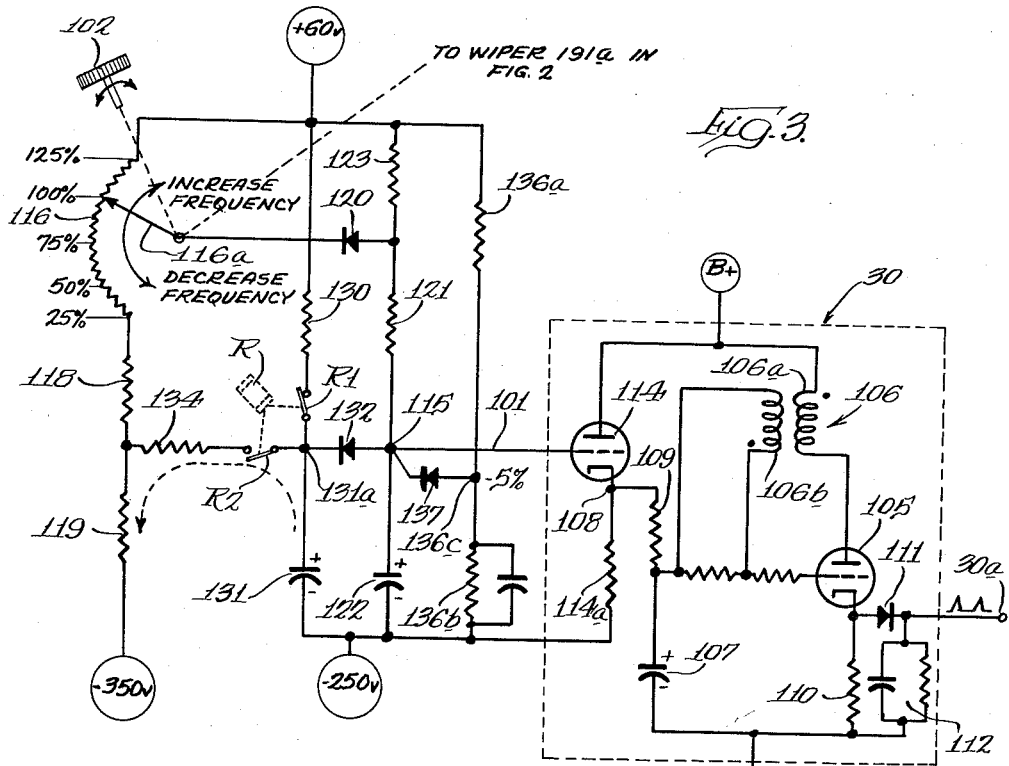
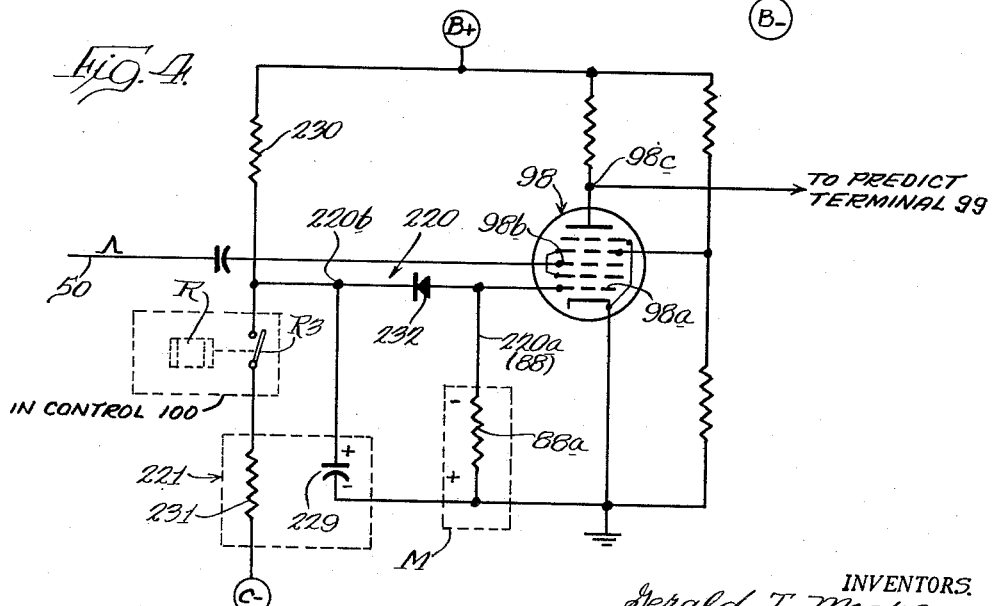

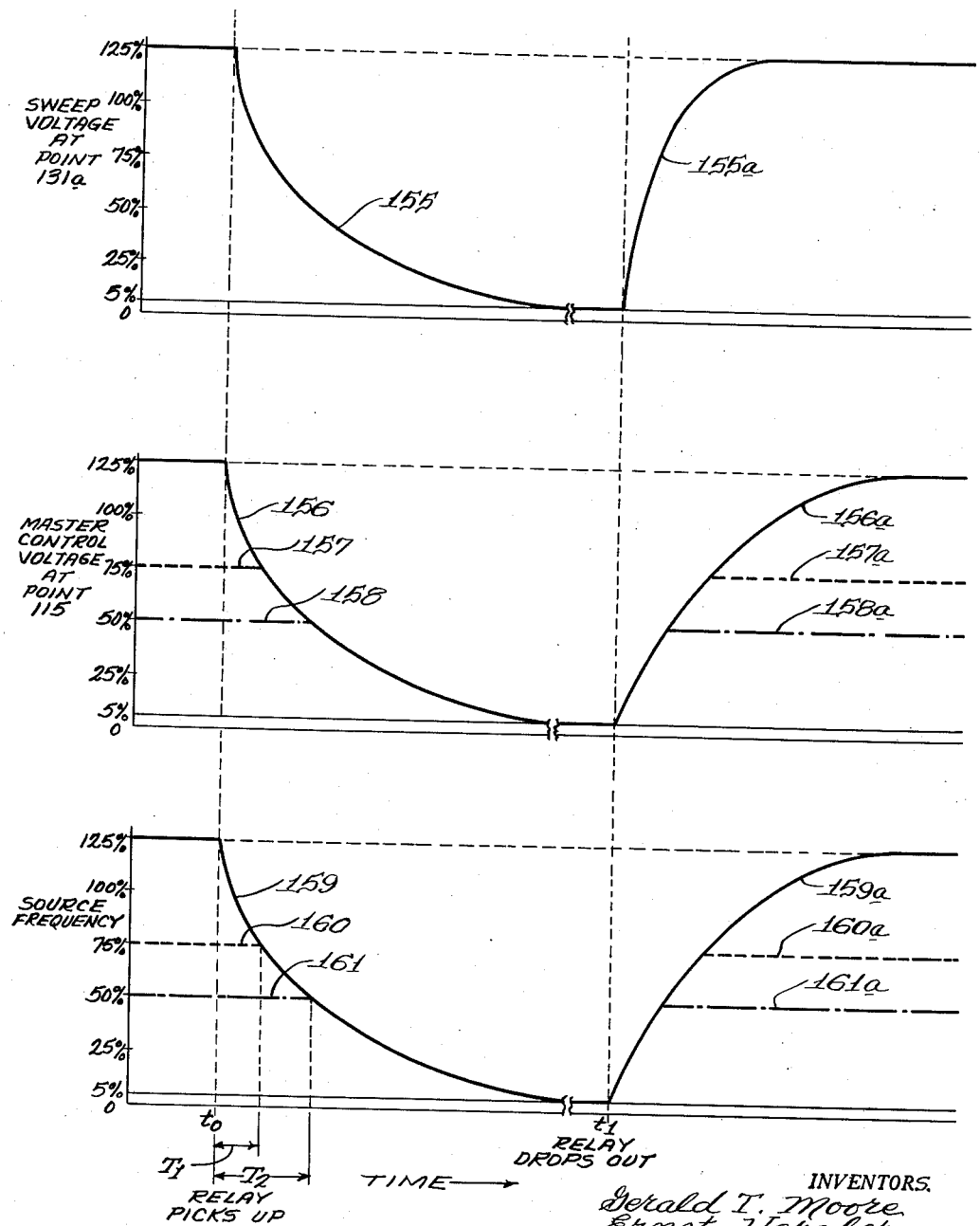

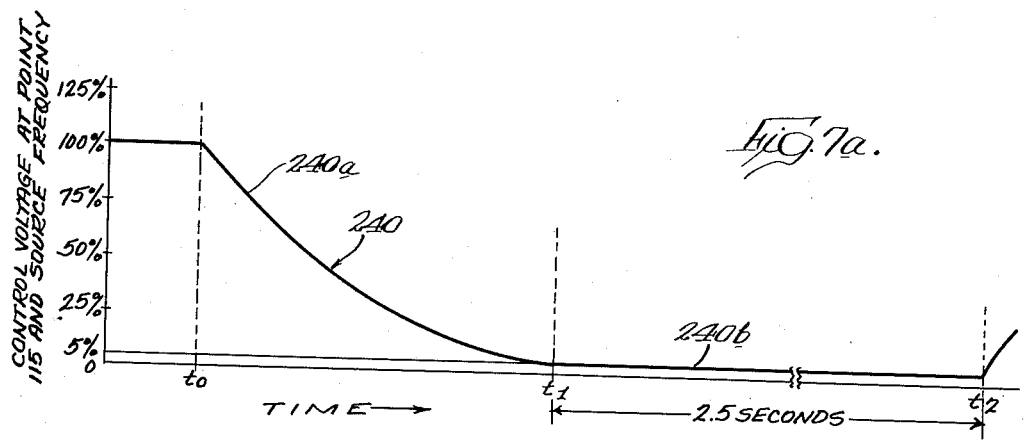
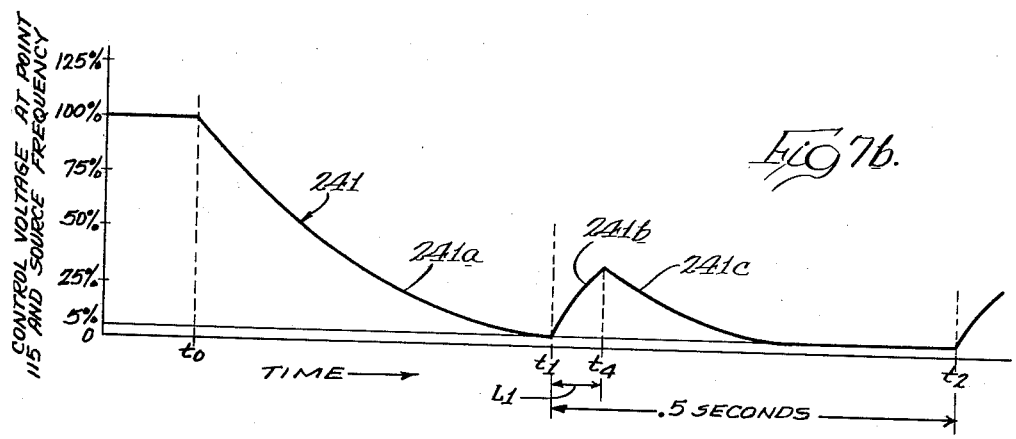
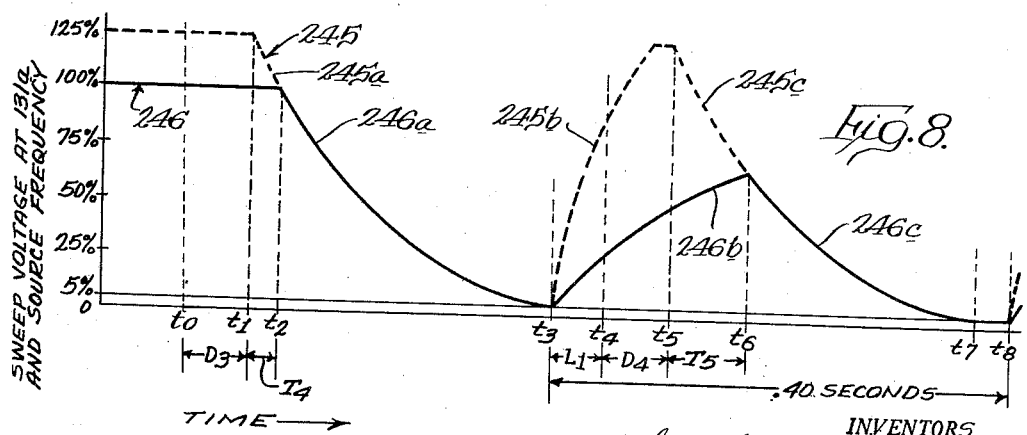

United States Patent Office 3,063,015
Patented Nov. 6, 1962

3,063,015
RATE CONTROL FOR DATA PROCESSING SYSTEMS
Gerald T. Moore, Bedford, Ernst Herzberg, Peabody, and Herbert P. Grossimon, Arlington, Mass., assignors to Giddings & Lewis Machine Tool Company, Fond du Lac, Wis., a corporation of Wisconsin
Filed Mar. 12, 1959, Ser. No. 799,044
32 Claims. (Cl. 328—41)

The present invention relates in general to data processing systems and in particular to systems for converting numerical information into corresponding numbers of signals or pulses spaced over different time periods. More specifically, the invention is directed to improvements in the "predicting" and "acceleration adjust" features which are basically disclosed and claimed in copending McDonough et al. application Serial No. 589,491, filed June 5, 1956, and assigned to the assignee of the present application.

For a better understanding of the background environment of the present invention, reference should be made to the above-mentioned McDonough et al. application, particularly FIGS. 14C, 28–34, and the corresponding portions of the specification. This background will also be treated briefly in the following detailed discussion.

For the present, it will suffice simply to know that in the prior "predict" and "acceleration adjust" arrangement, a predict signal is created after a predetermined percentage of one counting cycle or "block" of operation has been completed, by passing a pulse through a series array of gates controlled according to the condition of an interpolator counter. The percentages or durations of the predict intervals could not be conveniently changed, and the pulse or signal was subject to amplitude and width attenuation in passing through series-connected gates.

One object of the present invention is to provide an improved means for creating a "predict signal" which signifies that a counter or interpolator has received predetermined percentages of any of preselected numbers of recurring signals. For a given frequency of the recurring input signals, the preselected number counted by the interpolator establishes a particular normal time period necessary for the interpolator to complete one counting cycle. The predict interval, i.e., the interval between the appearance of a predict signal and the instant when the counting cycle would normally be completed, may conveniently be established, and indeed may be made to have the same duration as different time periods are measured off.

A related object is to provide such means for creating a predict signal which are characterized by simplicity of components and organization, and by a high degree of convenience with which the percentages of preselected numbers of input pulses which must occur before the predict signal appears may be changed or modified.

A further object is to achieve predicting means which involve little or no pulse width and amplitude attenuation, assuring more reliable operation.

As made clear in the aforementioned McDonough et al. application, abrupt and large changes in the frequency of interpolator output pulses are avoided by gradually reducing the frequency of interpolator input pulses before the end of one counting cycle, and then gradually increasing the frequency of such input pulses during the early portion of the next counting cycle. This is termed the "acceleration adjust" action since, in one application, it precludes large step changes in the velocity of a movable element which is driven at a rate substantially proportional to the effective frequency of the interpolator output pulses. As here disclosed, this action may be termed "rate adjust" since the present invention is concerned with means to prevent large step changes in the frequency or rate of interpolator output signals or pulses.

The "rate adjust" action necessarily extends the time required for the interpolator counter to complete a counting cycle, i.e., receive a predetermined number of input pulses, since it involves reducing the frequency of such input pulses. If the frequency of the input pulses is reduced to the lower limit and held at such low frequency for a considerable interval, then the time required to complete each counting cycle is unduly extended without adding to the desired result of reducing abrupt changes in the frequency of output pulses. For a whole program involving a relatively large number of successive counting cycles, the time required for processing the program of information may be "stretched" considerably if the frequency of interpolator input pulses is allowed to reside at a very low value during relatively long portions of each counting cycle.

It is a general aim of this invention greatly to reduce the durations of periods at which the interpolator operates with relatively low input and output frequencies, thereby largely eliminating the "time stretching" which is not necessary to successful "acceleration adjust" action. In this connection, it is an object to speed up the processing of numerical data while nevertheless avoiding large step changes in the frequency of interpolator output pulses, and the high accelerations or step changes in the velocity of a movable element which is translated at velocities proportional to interpolator output pulse frequencies.

Another object is to lessen such "time stretching" especially when the interpolator is operating with the input pulses supplied thereto at less than their maximum running frequency.

A related object of the invention is to cause greater shortening of "time stretch" as the interpolator operates at smaller percentages of the maximum input signal frequency by introducing a delay between the instant that a predict signal appears and the initiation of the smooth reduction in the input signal frequency, such delay being changed inversely with changes or adjustments in the running frequency of the input signal source.

Still another object is to provide such a delay between the instant of a predict signal and the instant of initiation of smooth decay in the interpolator input signal frequency by providing a first delay means varied in accordance with the adjusted running frequency of an input signal source and the decay of a sweep signal from a value proportional to the maximum running frequency, the frequency of the source being governed by an adjustable control signal which may be less than, but can never be greater than, the sweep signal. This produces a second delay, added to the first, between the appearance of a predict signal and the smooth reduction in input signal frequency, thereby further reducing "time stretch" and particularly when the running input frequency is low. It results in the terminal portion of a counting cycle being carried out with the input signals at a higher average frequency, yet enables the input frequency to be reduced smoothly to a very low value just before the end of the counting cycle.

A further object of the invention is to eliminate the possibility of the interpolator working during a whole counting cycle at the very low input signal frequency which is required only just before the end of the cycle. In this connection, the invention contemplates provisions to assure that the interpolator input signal frequency may rise appreciably at the beginning of a cycle if it has previously been reduced to a minimum value at the end of the preceding counting cycle, and even though a predict signal is generated at the begining or during the early portion of the second counting cycle.

A further object is to provide a relatively simple arrangement for sensing when one cycle of operation has involved an "adjust" action, when a succeeding cycle is a short one not greatly longer than the desired predict interval, and for reducing the predict interval for the second cycle only if those two conditions exist.

Other objects and advantages will become apparent as the following description proceeds, taken in conjunction with the accompanying drawings in which:

FIGURES 1a and 1b, when joined along the indicated junction line, constitute a block diagram (partially in schematic circuit form) of a data processing system embodying the features of the present invention and employing the improved predict signal generating means;

FIG. 2 is a schematic circuit diagram, partly in block form, of a portion of the rate adjust controls, particularly illustrating means for delaying the response to a predict signal according to the setting of the adjustable running frequency of an interpolator input signal source;

FIG. 2a is a series of graphs illustrating the operation of the adjustable delay means in FIG. 2.

FIG. 3 is a schematic circuit diagram of an exemplary variable frequency input signal source, together with means for adjusting and controlling the frequency thereof;

FIG. 3a is a series of graphs illustrating the operation of the frequency controlling apparatus shown in FIG. 3;

FIG. 4 is a schematic circuit diagram of a gate shown in block form in FIG. 1b, together with controls therefor to assure that short programmed periods are not carried out entirely with the input signal source at its lowest frequency;

Figure 5A:
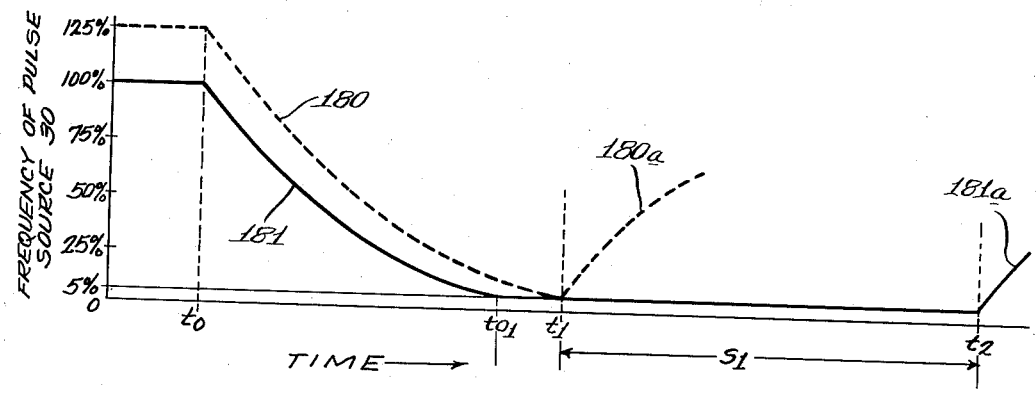
Figure 5B:
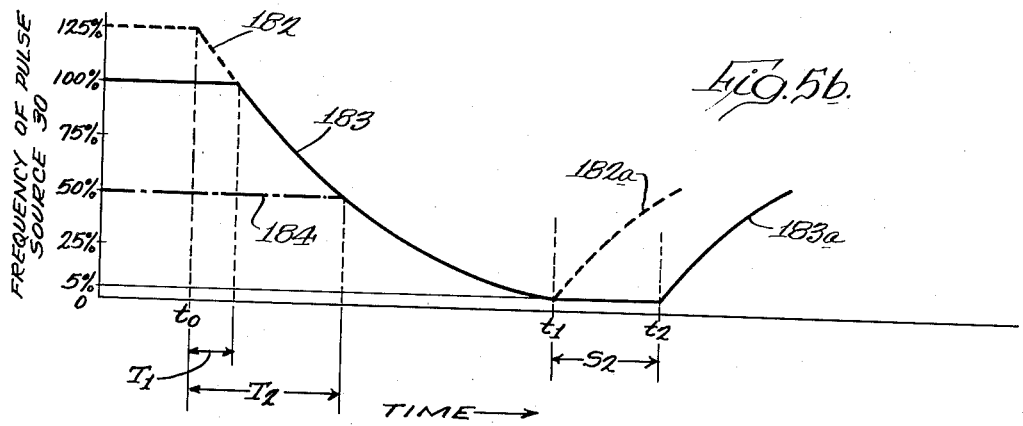
Figure 6A:
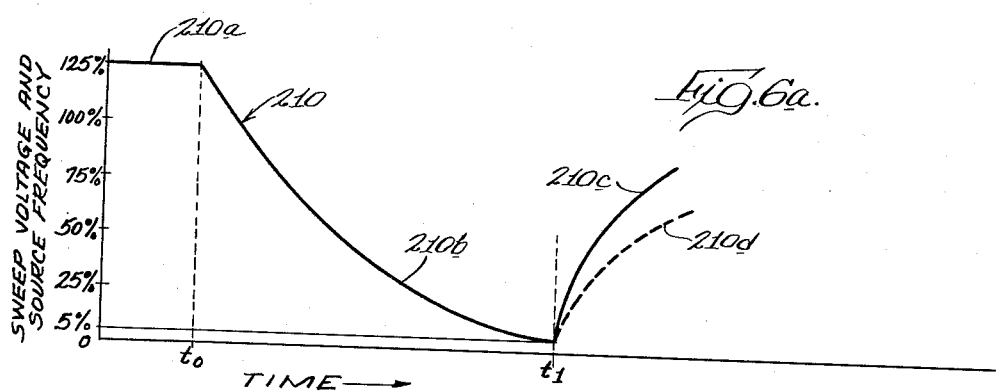
Figure 6B:
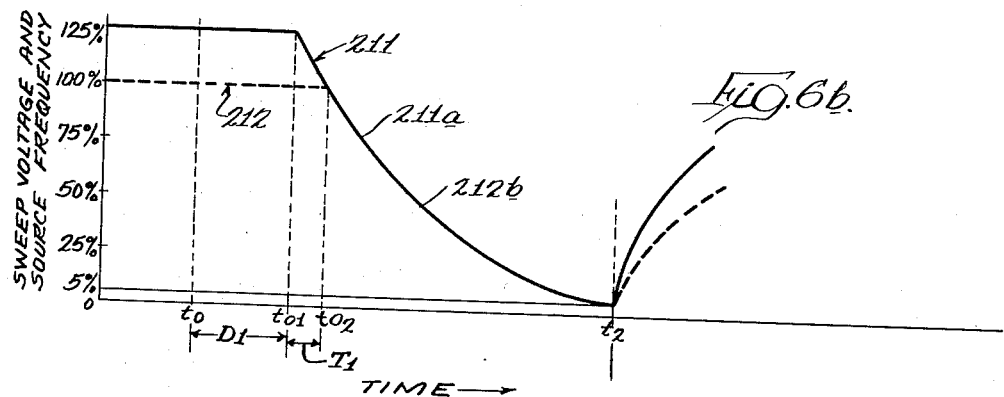
Figure 6C:
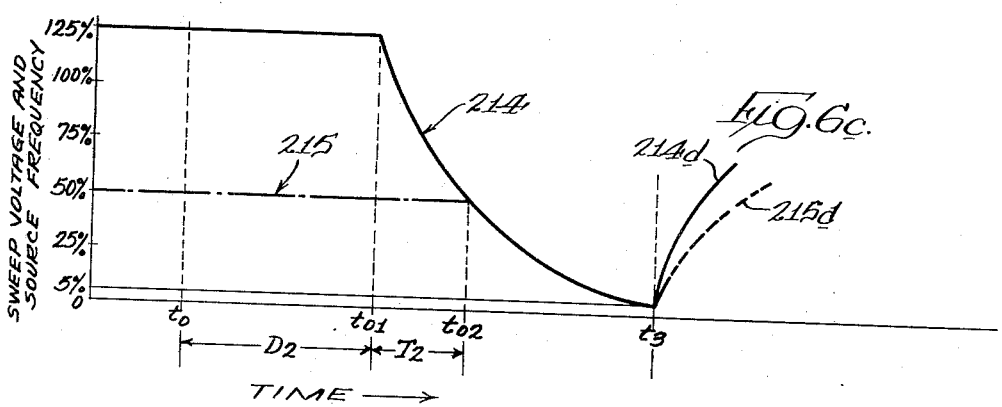

FIGS. 5a and 5b graphically illustrate the operation of the apparatus without and with the adjustable delay means of FIG. 2;

FIGS. 6a, 6b and 6c graphically illustrate the operation of the apparatus with both the "sweep" and the "adjustable" delay means of FIGS. 2 and 4, and with the input signal source respectively set to operate at 125 percent, 100 percent, and 50 percent of its normal frequency;

FIGS. 7a and 7b graphically illustrate the operation of the apparatus without and with the special delay means for short programmed periods but without "sweep" or "adjustable" delays; and FIG. 8 graphically shows the operation during a short programmed period with the combined action of "sweep," "adjustable," and "special" delays.

While the invention has been shown and will be described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

INTERPOLATOR

A part of an exemplary data processing system in which the present invention is employed is illustrated in FIGS. 1a and 1b. This includes an interpolator counter which counts off during successive counting cycles any of several different preselected numbers of recurring signals or pulses received from an adjustable frequency source.

As here shown, such counter is made up of a plurality of bi-stable elements, specifically, flip-flop circuits labeled "FF," connected in tandem counting relation. A first flip-flop 10 is connected in tandem relation with six decade flip-flop scaling units 11–16, and the latter such unit works into a final flip-flop 17. A carry output terminal 18 for the latter flip-flop may be termed the "transfer pulse" terminal since it will receive a pulse or output signal at the very end of each counting cycle.

Basic Components
FLIP-FLOP CIRCUITS

Before describing the operation of the interpolator counter as a whole, it may be pointed out that the flip-flops used therein are well known to those skilled in the art. Exemplary detailed circuits are illustrated by FIGS. 16 and 17 in the above-mentioned McDonough et al. application. Briefly stated, each such flip-flop may, in one form, be made up of two cross-connected vacuum tubes, each being complementally cut-off or conductive when the circuit is in its two possible stable states. Each such flip-flop switches from a "0" to a "1" state and from a "1" to a "0" state in response to two successive input pulses supplied thereto. The flip-flop produces a carry output pulse each time that it switches from the "1" to the "0" state, thus producing one-half as many output pulses as received input pulses. Thus, a single flip-flop operates as a means to divide by two.

Besides this, certain points or terminals in each flip-flop circuit reside at relatively high or low potentials depending upon whether the circuit is in the "1" or "0" state. Thus, the flip-flop may be used as a binary storage device and its state may be readily sensed. While flip-flops are specifically here shown and discussed, it is apparent that other bi-state elements such as magnetic cores may be used instead.

DECADE SCALING UNITS

By connecting two, three or four flip-flops in tandem relation so that the output pulses of one form the input pulses of the next, a unit is created which scales by a factor of four, eight or sixteen, respectively. In the present instance, however, it is desired to utilize units which scale by a factor of ten, i.e., each of which produces one carry output pulse for each ten input pulses. Since the decade units 11–16 are all substantially alike, a description of one will suffice for all.

Referring to the decade unit 11, four flip-flops A, B, C and D are tandemly connected in a special manner. Ordinarily, four tandem flip-flops will create a scaler or divider unit having a total ratio of sixteen operating on the straight binary scale. Division by ten is obtained in the present decade unit 11 through the use of a normally open gate E connected between the output of the flip-flop A and the input of the flip-flop B. A second normally closed gate F is connected between the output of the flip-flop A and the input of the flip-flop D.

The gate E is controlled by a potential from the fourth flip-flop D, so that it is closed whenever the latter flip-flop is in the "1" state. A suitable delay means $d1$ is interposed in the control line to give adequate switching time. The normally closed gate F is controlled through a second delay means $d2$ by a potential supplied from the flip-flop D, such gate being open or closed whenever the fourth flip-flop is in the "1" or "0" states, respectively.

As input pulses are supplied successively to the input terminal 11a for the unit, the four tandemly connected flip-flops behave as an ordinary binary scaling chain for the first eight pulses which are received. During this time, output pulses from the flip-flop A pass readily through the open gate E to the input of the second flip-flop B. However, after the eighth pulse has been received and the flip-flop D is switched to the "1" state, the gates E and F are respectively closed and opened. The ninth input pulse then switches the first flip-flop to the "1" state.

The tenth input pulse returns the flip-flop A to the "0" state, and creates an output pulse from that flip-flop which passes through the now-opened gate F to reset the flip-flop D to the "0" state. This provides a carry output pulse from the flip-flop D to the decade unit output terminal 11b. Also, when the flip-flop D is switched from the "1" to the "0" state, the gates E and F are restored to their normal conditions, i.e., respectively opened and closed. The counting or scaling action of the decade unit 11 may thus be illustrated by the following table:

TABLE I

| Input pulses | Flip-flop states | | | | |
|---|---|---|---|---|---|
| | A(1) | B(2) | C(4) | D(8) | |
| 0 | 0 | 0 | 0 | 0 | |
| 1 | 1* | 0 | 0 | 0 | |
| 2 | 0 | 1* | 0 | 0 | |
| 3 | 1* | 1 | 0 | 0 | |
| 4 | 0 | 0 | 1* | 0 | |
| 5 | 1* | 0 | 1 | 0 | |
| 6 | 0 | 1* | 1 | 0 | |
| 7 | 1* | 1 | 1 | 0 | |
| 8 | 0 | 0 | 0 | 1* | —Gates E and F close and open. |
| 9 | 1* | 0 | 0 | 1 | |
| 10 | 0 | 0 | 0 | 0 | —Output pulse on terminal 11b; gates E and F open and close. |
| *Non-carry outputs. | 5 | 2 | 1 | 1 | |

To "read" the number of input pulses which at any instant have been received by the decade unit 11, those ones of the flip-flops A, B, C, D, which are in the "1" state are assigned decimal values of 1, 2, 4, 8, respectively, and the values are simply added up. Thus, each decade unit may represent any decimal number according to a "1248" binary code. For example, a count of seven in a decade unit is represented by the four flip-flops being in 1110 states, as indicated in Table I above.

Table I shows that the decade unit 11 produces one carry output pulse on its output terminal 11b for each ten input pulses received on its input terminal 11a. After the tenth pulse has been received, the four flip-flops in the decade unit are restored to their original states, i.e., all set in the "0" state, so that the counting cycle for the unit will be repeated as the next ten input pulses are received.

It was noted above that a flip-flop produces a carry output pulse each time that it switches from the "1" to the "0" state. However, a flip-flop also produces a non-carry output signal each time that it switches from the "0" to the "1" state. These transitions from the "0" to the "1" state for the four flip-flops A, B, C, and D, are marked by asterisks in Table I. During each counting cycle of the unit, the flip-flops A through D, respectively produce 5, 2, 1 and 1 non-carry output pulses which are non-coincident in time. These non-carry output pulses are utilized in a manner to be described.

It is possible to make a decade scaling unit, such as the unit 11, scale by a factor of five if the input pulses are by-passed around the first flip-flop A. For this purpose, input pulses may be routed over an alternate input line 44, instead of the input line 43 leading to the terminal 11a. The input line 44 leads directly through OR circuits to the inputs of the two gates E and F. With the three flip-flops B, C, D, initially in the "0" state, the first four input pulses received over the line 32 pass through the normally open gate E to the input of flip-flop B. After the fourth pulse is received, however, a flip-flop D will be in the "1" state, causing the gates E and F to be respectively closed and opened. Thus, the fifth input pulse over the line 44 cannot pass through the gate E, but passes through the gate F directly to the input of the flip-flop D. This switches the flip-flop D from the "1" to the "0" state, producing a carry output pulse on the terminal 11b and restoring the three flip-flops B, D, C to the "0" state. The manner in which the unit 11 scales by five if input pulses are by-passed around the first flip-flop A is illustrated by:

TABLE II

| Input pulse | Flip-flop states | | | | |
|---|---|---|---|---|---|
| | A | B | C | D | |
| 0 | 0 | 0 | 0 | 0 | |
| 1 | 0 | 1 | 0 | 0 | |
| 2 | 0 | 0 | 1 | 0 | |
| 3 | 0 | 1 | 1 | 0 | |
| 4▲ | 0 | 0 | 0 | 1 | |
| 5* | 0 | 0 | 0 | 0 | —Carry pulse to terminal 11b. |

▲Gates E and F respectively close and open.
*Gates E and F respectively open and close.

A decade unit can be made to scale by a factor of two simply by by-passing input pulses around the first three flip-flops A, B, C and supplying them directly to the last flip-flop D. Under these circumstances, the last flip-flop D scales by a factor of two in the same manner as a single, isolated flip-flop. As illustrated in FIG. 1a, if input pulses are supplied over an input line 45, one output will be produced on the output terminal 11b for each two input pulses.

Considering now the interpolator counter as a whole (made up of the flip-flop 10, the six decade units 11–16, and the last flip-flop 17), a "counting cycle," as the term is here employed, is the operation of the interpolator in counting (from an original condition in which all of the flip-flops are in the "0" state) the number of input pulses necessary to produce a carry output or transfer pulse from the last flip-flop 17, such transfer pulse appearing on the terminal 18. It will be apparent that just before the last input pulse for any given counting cycle is received, all of the effective flip-flops in the interpolator will be in the "1" state. The last input pulse restores all of the flip-flops to the "0" state, and this switching of the flip-flop 17 to the "0" state produces a transfer pulse on the terminal 18.

In order to make the interpolator selectively count-off any one of a plurality of different predetermined numbers of pulses during different counting cycles, means are provided to change the effective "length" or over-all scaling ratio. This is done by selectively routing the input pulses from a suitable source over different ones of a plurality of input lines which by-pass different combinations of the flip-flops at the left end of the interpolator.

As here shown, an adjustable frequency recurring signal source 30 supplies pulses through a start-stop control 31 to the inputs of each of a plurality of gates 32–40 having their respective output terminals leading to nine different input lines 42–50. The gates 32–40 are selectively opened, one during each counting cycle, by a control signal supplied over one of the output lines leading from a time-selection storage device 51. This device receives successive sets of time information in the manner more fully described in the above-identified McDonough et al. application. It is sufficient to note here simply that input pulses from the source 30 may be routed over any one of the nine input lines 42–50 by opening a corresponding one of the gates 32–40.

Inspection of FIG. 1a will show that with input pulses passed over the first input line 42, all of the flip-flops are effective in the interpolator counter. Since the flip-flops 10 and 17 both scale by factors of two, and the six decade units 11–16 scale by factors of ten, the entire scaling ratio of the interpolator counter is $$2 \times 10 \times 10 \times 10 \times 10 \times 10 \times 10 \times 2$$

or $4 \times 10^6$. Thus, a total of four million pulses must be received from the source 30 over the input line 42 before a transfer pulse appears on the terminal 18.

If, however, input pulses are received over the lines 44 or 45, the unit 11 will scale by factors of five or two, respectively, and the first flip-flop 10 will be entirely by-passed. Under these circumstances, the scaling ratio of the interpolator counter is $1 \times 10^6$ or $4 \times 10^5$, respectively.

With the foregoing examples in mind, the following table will be readily understood as showing the different total scaling factors created when input pulses are routed over different ones of the input lines 42–50, and the predetermined numbers of pulses which must be received during the different counting cycles.

TABLE III

| Line receiving input pulses | Total scaling factor | Number of input pulses required to produce transfer pulse | Time period (sec.) with input frequency at 100% (80,000 p.p.s.) |
|---|---|---|---|
| 42 | 2×1 0×1 0×1 0×1 0×1 0×1 0×2 | 4×10⁶ | 50 |
| 44 | 1 0×1 0×1 0×1 0×1 0×1 0×2 | 2×10⁶ | 25 |
| 44 | 5×1 0×1 0×1 0×1 0×1 0×2 | 1×10⁶ | 12.5 |
| 45 | 2×1 0×1 0×1 0×1 0×1 0×2 | 4×10⁵ | 5 |
| 46 | 1 0×1 0×1 0×1 0×1 0×2 | 2×10⁵ | 2.5 |
| 47 | 5×1 0×1 0×1 0×1 0×2 | 1×10⁵ | 1.25 |
| 48 | 2×1 0×1 0×1 0×1 0×2 | 4×10⁴ | .5 |
| 49 | 1 0×1 0×1 0×1 0×2 | 2×10⁴ | .25 |
| 50 | 5×1 0×1 0×1 0×2 | 1×10⁴ | .125 |

The count stored, or the number of input pulses which have been received, by the interpolator counter at any instant is reflected by the respective states of the several flip-flops, taking into account the particular input line 42–50 which is in use. If, for example, the input line 44 is carrying input pulses, the first decade unit 11 scales by a factor of five, so that the total scaling factor is $5 \times 10 \times 10 \times 10 \times 10 \times 10 \times 2$. This means that the weight of the decimal digits stored (according to the 1248 binary code noted above) in the units 11, 12, 13, 14, 15, 16 and 17 is 1, 5, $5 \times 10$, $5 \times 10^2$, $5 \times 10^3$, $5 \times 10^4$, and $5 \times 10^5$, respectively. If the states of flip-flops are as shown below, then the decimal numbers stored are as tabulated:

| Unit | 11 | 12 | 13 | 14 | 15 | 16 | 17 |
|---|---|---|---|---|---|---|---|
| FF states | 0010 | 1100 | 1001 | 0001 | 1000 | 0110 | 1 |
| Dec. number | 4 | 3 | 9 | 8 | 1 | 6 | 1 |
| Multiplier | 1 | 5 | 5×10 | 5×10² | 5×10³ | 5×10⁴ | 5×10⁵ |

Applying the multipliers listed above, and summing:

```
1×5×10⁵ = 500,000
6×5×10⁴ = 300,000
1×5×10³ =   5,000
8×5×10² =   4,000
9×5×10  =     950
    3×5 =      15
    4×1 =       4
            -------
            809,969
```

This shows that when the input line 44 is in use and the flip-flops are in the indicated states, 809,969 input pulses have been received at that instant. The rationale of the foregoing example may be followed in determining the states which the several flip-flops must have if the counter has received a particular number of pulses during any counting cycles using any one of the input lines 42–50.

The pulse source 30 is adjustable in its frequency of operation. The normal running frequency may be chosen, for example, as 80,000 pulses per second. This running frequency may, however, be adjusted above or below the normal frequency value. The apparatus to be described may have its adjusted running frequency set to any value within the range 100,000 to 20,000 pulses per second. The normal frequency, e.g., 80,000 pulses per second, is termed for convenience the 100% frequency, and the running frequency may, therefore, be adjusted between 125% and 25% of the normal value.

Assuming that source 30 is set to operate at a 100% frequency of 80,000 pulses per second, the selection of the different input lines 42–50 also determines the nominal time period of any counting cycle. For example, if the input line 42 is selected by opening the gate 32, the interpolator counter must receive 4,000,000 pulses at a frequency of 80,000 pulses per second before a transfer pulse appears on the terminal 18. This will require fifty seconds from the start to finish of the counting cycle. In like manner, it will be seen that if any one of the input lines 42–50 is selected, the counting cycle will consume or measure-off the time period shown in the right column of Table III, supra, assuming that the pulse source frequency is 80,000 pulses per second and remains at that value during the entire counting cycle.

During each counting cycle, each of the effective flip-flops within the counter will produce a particular number of non-carry output pulses. For example, it is obvious that the last flip-flop 17 during any counting cycle will be switched once from the "0" to the "1" state, and once from the "1" to the "0" state. Thus, it will produce one non-carry output pulse. The decade unit 16 will go through two complete decade routines, each causing the four flop-flops A, B, C and D to produce the numbers of non-carry pulses which are set forth in Table I, supra. Thus, the four flip-flops A, B, C and D in the decade unit 16 will respectively produce 10, 4, 2 and 2 non-carry output pulses during any given counting cycle. The decade unit 15, on the other hand, will go through twenty complete decade counting routines, and the four flip-flops A, B, C and D therein will, therefore, produce 100, 40, 20 and 20 non-carry output pulses. In like manner, the numbers of non-carry output pulses from each of the flip-flops in the interpolator counter may be determined, and these numbers are, for convenience, labeled in FIGS. 1a and 1b opposite the connections leading from the non-carry output terminals of these flip-flops.

All of the non-carry output pulses from all the flip-flops in the interpolator counter are mutually non-coincident in time. That is, they are mutually spaced apart in time and have a substantially equal time spacing therebetween.

In order to produce interpolator output pulses which during successive counting cycles are proportional to different decimal numbers, a storage device 60 receives successive sets of decimal number information in "5211" coded binary form. The storage device 60 includes twenty-three bi-state elements BSE which are connected to receive non-carry output pulses from different ones of the counter flip-flops, as shown in FIGS. 1a and 1b. These bi-state elements are set apart in seven groups corresponding to hundreds, tens, units, tenths, hundredths, thousandths, and half-thousandths orders of a decimal number, and may be set to "1" or "0" states to represent according to a "5211" binary code any desired number between 0 and 299.9995.

The "5211" binary code is one in which four binary digits are assigned arbitrary values of 5, 2, 1 and 1, and the combination of those digits which have a particular one of two values may represent any decimal number between 0 and 9. This is the binary code according to which the tens, units, tenths, hundredths, and thousandths groups of bi-state elements BSE in the storage device 60 are set. It may be more readily understood with reference to the following table:

TABLE IV

| Decimal digit value | 5 | 2 | 1 | 1 |
|---|---|---|---|---|
| 0 | 0 | 0 | 0 | 0 |
| 1 | 0 | 0 | 0 | 1 |
| 2 | 0 | 1 | 0 | 0 |
| 3 | 0 | 1 | 0 | 1 |
| 4 | 0 | 1 | 1 | 0 |
| 5 | 1 | 0 | 0 | 0 |
| 6 | 1 | 0 | 0 | 1 |
| 7 | 1 | 1 | 0 | 0 |
| 8 | 1 | 1 | 0 | 1 |
| 9 | 1 | 1 | 1 | 1 |

The first and second bi-state elements at the left of the storage device 60 may by their states represent a hundredths order digit of 0, 1 or 2, according to the following notation:

TABLE V

| Decimal digit | 1st BSE | 2nd BSE |
|---|---|---|
| 0 | 0 | 0 |
| 1 | 0 | 1 |
| 2 | 1 | 0 |

Finally, the bi-state element at the extreme right in FIG. 1b can represent a half-thousandth in a decimal number value if it is in the "1" state.

The storage device 60 includes means for causing the non-carry pulses supplied to each bi-state element to pass to a common output line 61 only if that bi-state element is in the "1" state. Thus, during each counting cycle a particular number of pulses will appear on the output line 61, and those pulses will be proportional in their absolute number to the value of the decimal number stored in coded binary form in the device 60. For example, if the number 087.2340 is stored in the device 60, the bi-state elements BSE will be set in the following states:

Decimal number   0   8      7    2      3    4    0
States of BSE's  00 1101 1100 0100 0101 0111 0

As the interpolator counter goes through one counting cycle, the number of output pulses appearing on the line 61 will be the sum of the non-carry pulses generated by those particular flip-flops associated with bi-state elements which are in the "1" state. If that summation is made, it will be seen that a total of 174,468 pulses will appear on the output line 61. These output pulses will all be non-coincident in time, and will be substantially uniformly spaced apart. If the line 42 is receiving input pulses during this counting cycle, the 174,468 pulses will be generated in a period of fifty seconds, and thus have a nominal frequency of 34,893.6 pulses per second. By contrast, if the input line 43 has been selected then the 174,468 output pulses will be generated in a period of 25 seconds (assuming the pulse source to be operating at a 100% frequency of 80,000 pulses per second) and the nominal frequency of the output pulses will be 69,787.2 pulses per second.

From this example, it will be clear that successive sets of time and number information may be supplied to the storage devices 51 and 60. The time information supplied to the device 51 determines the predetermined number of pulses which must be received by the interpolator counter in order to complete one counting cycle, and thus with the pulse source 30 operating at a fixed frequency, determines the time period over which the counting cycle extends (see Table III). The numerical information stored in the device 60 determines the total number of interpolator output pulses which will be generated on the output line 61 during any counting cycle. The ratio of the time information and number information in the devices 51 and 60 will determine the nominal frequency or rate at which the output pulses are generated.

As fully explained in the above-identified McDonough et al. application, successive sets of time and number information are supplied to the storage devices 51 and 60 for successive counting cycles of the interpolator. This is done by feeding back the transfer pulse appearing on the terminal 18 at the end of each counting cycle to terminals 60a and 51a of devices 60b and 51b which "reads in" a new set of numerical information to the storage devices 51 and 60. The transfer pulse 18 is also sent back to a terminal 31a in the start-stop control 31, momentarily disconnecting the pulse source 30 from all of the gates until the new set of time and number information has been received in the storage devices 51 and 60.

Insofar as the present invention is concerned, it need only be understood that the data processing system illustrated in FIGS. 1a and 1b is capable of generating successive sets of interpolated output pulses on the line 61. Each set of output pulses is proportional in its absolute number to the decimal value stored in the device 60, and extends over a time period which is determined by the time information stored in the device 51. The frequency or rate of the output pulses within each set is determined by the ratio of the time and numerical information. Since each set of output pulses follows almost immediately after the preceding set, it is possible that the nominal frequency of one set will be considerably different from the nominal frequency of the preceding set. In cases where the output pulses are used to govern the motions of movable elements, as described in the McDonough et al. application, this means that the movable element must undergo a very abrupt acceleration if its velocity is to remain substantially proportional to the nominal frequency of the interpolated output pulses.

To briefly explain the problem which is more fully set forth in the McDonough et al. application, it may be noted here that the output pulses on the line 61 may be supplied to a decoder which converts them into a quasi-analogue signal. The latter varies by an amount proportional to the number of output pulses and at a rate proportional to the frequency of the output pulses. This analogue signal is utilized to control a power drive (preferably of the servo feedback type) which moves a translatable element through distances proportional to the number of interpolated output pulses and at rates which are proportional to the frequency of such output pulses. If successive sets of output pulses generated during successive counting cycles of the interpolator counter have materially different nominal frequencies, then the drive system is required to change the speed of the movable element almost instantaneously between two widely different values. This may involve an almost infinite acceleration. Where the power of the drive system is limited and the inertia of the movable element is large, it may be impossible for the servo drive system to keep the movable element reasonably in agreement with the schedule of distances, velocities and accelerations called for by the interpolated output pulses.

In order to avoid abrupt changes in the rate or frequency of interpolated output pulses, provision is made gradually to reduce the frequency of such output pulses just before the end of an interpolator counting cycle, and then gradually to restore that rate or frequency to the scheduled value during the early portion of the succeeding counting cycle. For example, if the output pulses on the line 61 are occurring during a first counting cycle at a rate of 1,000 per second, and the next counting cycle would normally result in output pulses at a rate of 100,000 per second, a step increase of 99,000 pulses per second would be required. This is avoided by causing the rate of the output pulses to be gradually reduced to, say, 5% of that called for before the transition occurs at the end of the first counting cycle, and then to be gradually increased again to the second scheduled rate during the early portion of the second counting cycle. Just before and just after the transition between the two counting cycles, the output pulse rates would, therefore, be 50 and 5,000 pulses per second, involving a step change in frequency of only 4,950 pulses per second. This smaller step change is acceptable by utilization apparatus such as servo drives for moving translatable elements.

PREDICT SIGNAL

In order to accomplish the foregoing, means are provided to determine when the interpolater counter has received a predetermined percentage of any of the several possible preselected numbers of input pulses for a given counting cycle. Since at a given input pulse frequency the number of required input pulses (selected by opening a particular one of the gates 32–40) determines the time period of the counting cycle, the percentage completion point at which the "predicting action" takes place must be different for each of the several possible counting cycles involving different numbers of received pulses.

In keeping with the present invention, an arrangement improved in its simplicity, reliability and flexibility is here provided for creating a "predict signal" whenever the interpolator counter has come to within certain percentages of completing different counting cycles. For this purpose, a plurality of logical AND devices are respectively partially conditioned when the interpolator is going through counting cycles involving different numbers of input pulses or time periods. Each such AND device is also partially conditioned when a different combination of flip-flops in the interpolator counter are all in the "1" state. When any of the AND devices is conditioned by both such conditioning means, it creates a "predict" signal.

As here shown in FIGS. 1a and 1b, a matrix M is constructed with thirteen input lines 65–77. These input lines are connected respectively to different ones of the last several flip-flops in the interpolator counter in order to sense the states of such flip-flops. Specifically, each such input line will be placed at a negative potential, say −20 volts, with respect to a reference or ground potential whenever the associated flip-flop is in the "0" state. Conversely, each such input line 65–77 will be placed at a higher potential, say zero volts or ground potential, whenever the associated flip-flop is in the "1" state.

The matrix M has nine output lines 80–88, each of which is connected to a point of ground potential through a corresponding resistor 80a–88a. Each output line is interconnected with a particular combination of the input lines 65–77 by asymmetrically conductive elements or diodes poled to permit current flow in a direction from the output line to the input line. For example, the output line 80 is connected to input lines 65, 66, 69, 70, 73, 75 and 77 by a plurality of diodes 80b, and thus to the particular flip-flops to which those input lines are connected. If any one of the flip-flops associated with the input lines 65, 66, 69, 70, 73, 75 or 77 is in the "0" state, current will flow through the associated diode and the resistor 80a, placing the output line 80 below ground potential, i.e. at substantially −20 volts. If all of those particular flip-flops are in the "1" state, then the output line 80 will rise to, say, zero volts.

The same operation occurs for the remaining output lines 81–87, although because they are connected to different combinations of the input lines 65–77 by different groups of diodes 81b–87b, they will remain at negative potentials relative to ground until different combinations of the interpolator flip-flops are all set to the "1" state.

The output lines 80–88 lead respectively to the first or controlling inputs of a corresponding plurality of predict gates 90–98. The second inputs of these gates are connected to respective ones of the interpolator input lines 42–50. Thus, during any given counting cycle, only one of the predict gates 90–98 will be receiving pulses coming from the source 30. Such pulses will normally be blocked by that gate, and a first such pulse will be passed as a predict signal only when the flip-flops associated with the corresponding matrix input lines are all simultaneously in the "1" state. Although a series of pulses may pass through a predict gate after it is opened, it is only the first such pulse which is used; the succeeding pulses are not utilized but their passage through an open gate does no harm. The output terminals of all predict gates 90–98 lead to a common "predict" terminal 99.

In the exemplary arrangement here shown, it is desired to have the predict signal appear about one-eighth second (0.125 second) before the scheduled end of any counting cycle. Assuming the frequency of the source 30 is set to a normal value of 80,000 pulses per second, the predict signal must be made to appear when the interpolator has received all but the last 10,000 pulses for any counting cycle. That is, one-eighth second requires 10,000 pulses if the pulse rate is 80,000 pulses per second.

In the case of a counting cycle requiring a total of 4,000,000 input pulses (see Table III, supra), the predict signal must appear after 3,999,000 pulses have been received. In the case of a counting cycle requiring a total of 200,000 input pulses, the predict signal must appear after 190,000 pulses have been received. In the first instance, 99.975% of the total pulses must be received before a predict pulse appears. In the second instance, only 95% of the total input pulses must be received before a predict pulse occurs.

In keeping with the invention, each of the predict gates 90–98 is so controlled by a particular combination of diodes connected to the matrix input lines 65–77 that it opens when the interpolator still has to receive 10,000 pulses during a counting cycle with input pulses received over that one of the input lines 42–50 which corresponds to that predict gate. The manner in which the diodes are located in the matrix M will be better understood with reference to the following table:

TABLE VI

| Selected input line | Nominal cycle time, sec. | Total input for cycle | Input pulses rec'd at predict instant | "Reading" of interpolator flip-flops | | | | | | | | | Percent total pulses rec'd at pred. | Nominal predict interval, sec. |
|---|---|---|---|---|---|---|---|---|---|---|---|---|---|---|
| 42 | 50 | 4,000,000 | 3,990,000 | 10<br>1<br>0<br>0 | 11<br>2<br>0<br>0000 | 12<br>2×10<br>0<br>0000 | 13<br>2×10²<br>0<br>0000 | 14<br>2×10³<br>0<br>0000 | 15<br>2×10⁴<br>5<br>1010 | 16<br>2×10⁵<br>9<br>1001 | 17<br>2×10⁶<br>9<br>1001 | 1<br>1 | Unit ref. character<br>Multiplier<br>Dec. number held for predict.<br>Binary states of flip-flops. | 99.975 | .125 |
| 43 | 25 | 2,000,000 | 1,990,000 |  | 11<br>1<br>0<br>0000 | 12<br>10<br>0<br>0000 | 13<br>10²<br>0<br>0000 | 14<br>10³<br>0<br>0000 | 15<br>10⁴<br>9<br>1001 | 16<br>10⁵<br>9<br>1001 | 17<br>10⁶<br>1<br>1 |  | Unit ref. character<br>Multiplier<br>Dec. number held for predict.<br>Binary states of flip-flops. | 99.50 | .125 |

TABLE VI—Continued

| Selected input line | Nominal cycle time, sec. | Total input for cycle | Input pulses rec'd at predict instant | "Reading" of interpolator flip-flops | | | | | | | | Percent total pulses rec'd at pred. | Nominal predict interval, sec. |
|---|---|---|---|---|---|---|---|---|---|---|---|---|---|
| 44 | 12.5 | 1,000,000 | 990,000 | 11<br>1<br>0<br>000 | 12<br>5<br>0<br>0000 | 13<br>$5\times10$<br>0<br>0000 | 14<br>$5\times10^2$<br>0<br>0000 | 15<br>$5\times10^3$<br>0<br>0001 | 16<br>$5\times10^5$<br>8<br>1001 | 17<br>$5\times10^5$<br>9<br>1 | Unit ref. character<br>Multiplier<br>Dec. number held for predict<br>Binary states of flip-flops. | 99.00 | .125 |
| 45 | 5.0 | 400,000 | 390,000 | 11<br>1<br>0<br>0 | 12<br>2<br>0<br>0000 | 13<br>$2\times10$<br>0<br>0000 | 14<br>$2\times10^2$<br>0<br>0000 | 15<br>$2\times10^3$<br>5<br>1010 | 16<br>$2\times10^5$<br>9<br>1001 | 17<br>$2\times10^5$<br>1<br>1 | Unit ref. character<br>Multiplier<br>Dec. number held for predict.<br>Binary states of flip-flops. | 97.50 | .125 |
| 46 | 2.5 | 200,000 | 190,000 | 12<br>1<br>0<br>0000 | 13<br>10<br>0<br>0000 | 14<br>$10^2$<br>0<br>0000 | 15<br>$10^3$<br>0<br>0000 | 16<br>$10^5$<br>9<br>1001 | 17<br>$10^5$<br>1<br>1 | | Unit ref. character<br>Multiplier<br>Dec. number held for predict.<br>Binary states of flip-flops. | 95.00 | .125 |
| 47 | 1.25 | 100,000 | 90,000 | 12<br>1<br>0<br>000 | 13<br>5<br>0<br>0000 | 14<br>$5\times10$<br>0<br>0000 | 15<br>$5\times10^2$<br>0<br>0000 | 16<br>$5\times10^3$<br>8<br>0001 | 17<br>$5\times10^4$<br>1<br>1 | | Unit ref. character<br>Multiplier<br>Dec. number held for predict.<br>Binary states of flip-flops. | 90.00 | .125 |
| 48 | .50 | 40,000 | 30,000 | 12<br>1<br>0<br>0 | 13<br>2<br>0<br>0000 | 14<br>$2\times10$<br>0<br>0000 | 15<br>$2\times10^2$<br>0<br>0000 | 16<br>$2\times10^3$<br>5<br>1010 | 17<br>$2\times10^4$<br>1<br>1 | | Unit ref. character<br>Multiplier<br>Dec. number held for predict.<br>Binary states of flip-flops. | 75.00 | .125 |
| 49 | .25 | 20,000 | 10,000 | 13<br>1<br>0<br>0 | 14<br>10<br>0<br>0000 | 15<br>$10^2$<br>0<br>0000 | 16<br>$10^3$<br>0<br>0000 | 17<br>$10^4$<br>1<br>1 | | | Unit ref. character<br>Multiplier<br>Decimal number held for predict.<br>Binary states of flip-flops. | 50.00 | .125 |
| 50 | .125 | 10,000 | 0 | 13<br>1<br>0<br>000 | 14<br>5<br>0<br>0000 | 15<br>$5\times10$<br>0<br>0000 | 16<br>$5\times10^2$<br>0<br>0000 | 17<br>$5\times10^3$<br>0<br>0 | | | Unit ref. character<br>Multiplier<br>Decimal number held for predict.<br>Binary states of flip-flops. | 0 | .125 |

The numbers of input pulses received, or the "count" stored by the interpolator, at the instant the predict pulse is to be created are shown in the fourth column of Table VI. For each counting cycle, this number of pulses is 10,000 less than the total, predetermined number of input pulses (third column) for the complete counting cycle.

The fifth column of Table VI indicates several things for each possible counting cycle. It identifies the units 10–17 which are effective in the counter for any selected input line 42–50. It further shows the weighted value or multiplier assigned to each decimal digit stored in any of the units. The decimal numbers which must be stored in the respective units to represent the number of input pulses listed in the fourth column are set out, together with the binary states of the flip-flops in each unit which correspond to the decimal numbers according to the "1248" code mentioned above.

Taking the input line 44, for example, Table VI shows that 999,000 pulses should be received by the interpolator before a predict pulse is generated. The interpolator is working with a total scaling ratio of $$5\times10\times10\times10\times10\times10\times2$$

or $10^6$. This means that when the single flip-flop 17 (FIG. 1b) has received one input pulse and is set in the "1" state, one-half million or $5\times10^5$ input pulses have been received on the line 44. For each count stored in the decade unit 16, $5\times10^4$ pulses have been received on the line 44. For each count stored in the decade unit 15, $5\times10^3$ pulses have been received on the line 44. When 999,000 pulses have been received over the line 44, therefore, the last flip-flop 17 must be in the "1" state, the decade unit 16 must be in the "9" state, and the decade unit 15 in the "8" state. The other units may store zeros. The flip-flops A, B, C, D in the decade units 15 and 16 must be in the states 0001 and 1001 to represent the decimal states of "8" and "9," respectively, according to the "1248" code. It is evident, therefore, that when the counter is receiving input pulses over the line 44, the predict signal should occur when the last flip-flop 17, the A and D flip-flops in the unit 16, and the flip-flop D in the unit 15 are all simultaneously in the "1" state.

This fact is recognized by diodes 82b in the matrix M interconnecting the output line 82 with the input lines leading to the particular flip-flops mentioned. The matrix output line 82 controls the gate 92 which receives input pulses over the line 44 if that line has been selected for the interpolator input. Thus, the four flip-flops named above will all be first simultaneously in the "1" state, and the diodes 82b all simultaneously non-conductive, so that the output line 82 rises in potential to open the gate 92 and cause the latter to pass a pulse to the predict terminal 99—when the interpolator counter has received 990,000 input pulses (or 99% of the total of one million input pulses) required for the counting cycle. This means that after the predict signal appears on the terminal 99, ten thousand more pulses must be received by the interpolator before the counting cycle is complete. If the source 30 continues operation at 80,000 pulses per second, a nominal predict interval of 0.125 second will elapse (out of a total cycle nominal time of 12.5 seconds) between the instant the predict signal appears and the end of the cycle. This is termed a "nominal" predict interval since the source frequency may not remain constant, as explained below.

From the foregoing example, and with reference to Table VI, it will be apparent how the diodes are located in the matrix M in order to produce predict signals approximately 0.125 second before the ends of counting cycles involving different predetermined total numbers of input pulses.

Table VI indicates that when input line 42 is selected, flip-flops 17, A and D in units 16 and 15, and A and C in unit 14 will all be in the "1" state the instant a predict pulse is required. As shown in FIG. 1b, diodes 80b connect matrix output line 80 to input lines 65, 66, 69, 70, 73, 75 and 77 which lead to those particular flip-flops. Thus, output line 80 will open gate 90 to let the latter pass a predict pulse to the terminal 99 as soon as the interpolator has received 99.975% of the four million input pulses required for the counting cycle.

In like manner, diodes 81b connect matrix output line 81 to input lines 65, 66, 69, 70, 73 leading to flip-flops 17, D and A in unit 16, and D and A in unit 15 (FIG. 1b). As shown by Table VI, these flip-flops will be in the "1" state and cause the gate 91 to be opened at the proper instant if the latter is receiving input pulses over line 43.

Brief inspection will reveal that the diode groups 80b–88b in the matrix of FIG. 1b connect their respective output lines 80–88 to the particular combination of the flip-flops indicated by the fifth column of Table VI to be simultaneously in the "1" state when predicting is to occur with the interpolator receiving input pulses over lines 42–50, respectively. This produces the predict signals when the several different counting cycles have come to within the respective predetermined percentages of completion which are listed in Table VI. And despite the fact that the different counting cycles measure-off different nominal time periods, the nominal predict interval will be the same for all counting cycles.

The arrangement shown in FIGS. 1a and 1b for generating such "predict" signals to provide substantially uniform "predict" intervals is especially simple in its organization. For example, the matrix M is made up of nine relatively simple diode AND circuits, each matrix output line 80–88 constituting the output of one AND circuit which has a plurality of inputs determined by the number of diodes 80b–88b which are connected to that particular output line. The matrix output lines 80–88 control the gates 90–98 which respectively receive on their other input terminals interpolator input pulses when the interpolator is operating in the nine respective possible counting cycles. These gates also constitute AND circuits. It will be understood that the gates 90–98 could logically be included within the matrix M by connecting the interpolator input lines 42–50 to the respective matrix output lines through diodes. While this is within the scope of the present invention, the arrangement illustrated which utilizes the separate gates 90–98 is preferred since the gates conveniently form means to amplify and shape the predict pulses which are passed to the predict terminal 99.

The matrix input lines 68, 72, 74, and 76 are not connected by diodes to any of the output lines 80–88. Thus, these input lines in the particular arrangement illustrated perform no function. However, such input lines are here shown simply to illustrate that the matrix M provides a very flexible arrangement permitting quick and convenient changes in the predict percentages and intervals. To change the predict intervals to some value other than .125 second, all that is required is that a different combination of the matrix input lines 65–77 be connected to the respective output lines through unidirectionally conductive devices or diodes. Since such changes in the connections of the diodes can be made in a matter of a few minutes, or since an entirely separate matrix M may be substituted for the one illustrated, it is an easy and quick task to modify the illustrated apparatus so that the predict pulses will occur on the predict terminal 99 with timing which provides different predict intervals. When the illustrated apparatus is utilized to process numerical information and generate interpolated output pulses used to control the motions of different movable elements having drives of different power capacity and different inertia, it is highly advantageous to be able to change the predict intervals quickly.

The pulse source 30 is adjustable in its running frequency. As here illustrated, a rate adjust control 100 is connected via a line 101 to the pulse source 30, the signal or potential on the line 101 determining the frequency of the pulse source 30. This frequency may be manually set by adjusting a knob 102. In the example previously given, the running frequency of the source 30 may be set between 100,000 and 20,000 pulses per second, i.e., 125% and 25% of a normal 100% frequency of 80,000 pulses per second.

If instead of the pulse source 30 operating at a 100% frequency, the latter is adjusted to some other running frequency of operation, then the cycle times will be correspondingly increased or decreased, and the "predict" intervals will be correspondingly increased or decreased. Simply by way of example, if the pulse source 30 is set to operate at a 50% running frequency (40,000 pulses per second), then even though input pulses are passed to the interpolator over the input line 42, a complete counting cycle will require 100 seconds rather than 50 seconds. Also, the "predict" signal passed by the gate 90 under these circumstances will occur 0.25 second before the expected end of the counting cycle rather than 0.125 second. It will also be apparent that if the pulse source 30 is operating at a 50% frequency, then the nominal frequency of the interpolated output pulses appearing on the line 61 will be one-half of the frequency which would normally be generated from a given set of time and numerical information in the storage devices 42 and 60.

PULSE SOURCE AND FREQUENCY CONTROL

One exemplary form of a variable frequency pulse source 30 is illustrated in FIG. 3 as a blocking oscillator. This comprises a triode vacuum tube 105 having its anode connected through one winding 106a of a feedback transformer 106 to a positive voltage source (conventionally indicated by the symbol B+), the secondary winding 106b of the transformer being connected to the control electrode or grid of the triode so that as current through the tube progressively increases a feedback potential is obtained which makes the grid more positive and drives the tube to conductive saturation. Due to grid current flow, a controlling capacitor 107 will be charged negatively, so that as the current through the tube ceases to increase, the grid will be placed below the cut-off potential. The tube thus ceases conduction and the controlling capacitor begins charging positively from a point 108 of positive potential through a charging resistor 109. This recharging of the capacitor 107 again raises the potential of the grid of the tube 105 until it reaches and rises above cut-off potential. The tube 105 thus intermittently conducts heavily and is cut-off, producing recurring output signals or pulses across a cathode resistor 110. Pulses from the blocking oscillator 30 are passed to the output terminal 30a through a diode 111 and a shaping circuit 112.

As is well known, the frequency of operation of the blocking oscillator 30 depends upon the time period required for the controlling capacitor 107 to charge positively and initiate condition of the triode after the capacitor has been charged negatively and the triode 105 has been cut off. This charging time depends not only upon the time constant of the resistance-capacitance circuit made up by the resistor 109 and the capacitor 107, but also upon the magnitude of the voltage appearing at 108 which serves as a source for charging the capacitor 107. Thus, the frequency of the blocking oscillator 30 is in general proportional to the magnitude of the positive potential which appears at the point 108. The point 108 is the output terminal of a cathode follower stage made up of a triode 114 having a cathode resistor 114a. The input to the cathode follower control electrode is supplied to the blocking oscillator over the line 101 (see FIGS. 1a and 1b) from a master voltage control point 115. Since the potential at the point 108 closely follows the potential at the point 115, it may be considered that the frequency of operation of the blocking oscillator 30 varies directly with the potential at the master control point 115.

For adjusting the potential of the master control point 115, a voltage divider made up of a potentiometer 116 and two resistors 118, 119 is connected across a suitable voltage source, here illustrated as having terminals at +60 and −350 volts relative to ground or a point of reference potential. The potentiometer 116 has a wiper 116a adjustable therealong in response to settings of the knob 102. The wiper 116a is connected through a diode 120 to the junction of two resistors 121, 123 connected in series with a capacitor 122 between the +60 volt source and a point of negative source potential here illustrated as −250 volts. The voltage at the master control point 115 (formed by the junction of the resistor 121 and capacitor 122) depends upon the charge of the capacitor 122, which is positively charged by current flow through resistors 121, 123. The steady, maximum value of this voltage is, however, determined by the setting of the wiper 116a, since the diode 120 will become conductive if the control voltage at point 115 attempts to rise above the voltage of the wiper 116a. The diode 120 clamps the maximum control voltage at 115 to a value determined by the position of the wiper 116a, so that the setting of the wiper determines the running frequency of the pulse source 30. Depending upon the setting of the wiper 116a, the capacitor 122 will be charged positively to different voltages, thereby making the voltage at the control point 115 take on different values. The potentiometer 116a may be calibrated directly in percentages of pulse source frequency, since as the wiper 116a is moved up or down along the potentiometer 116 the voltage at the point 115 will increase or decrease and the frequency of the blocking oscillator 30 will correspondingly increase or decrease. With the wiper 116a set at the 100% point, the blocking oscillator 30 will produce pulses at a frequency of 80,000 per second, while as the wiper is moved to the 125% or 25% points on the potentiometer 116, the frequency of the blocking oscillator 30 will be changed to 100,000 or 20,000 pulses per second, respectively.

For a purpose to be made clear below, a resistor 130 is connected in series with normally closed contacts R1 (controlled by a relay R) and a "sweep" capacitor 131 between the +60 volt and −250 volt source points. The capacitor 131 will, therefore, normally be charged with the positive polarity indicated, the terminal 131a thereof being at the same potential as the upper or 125% point on the frequency-controlling potentiometer 116. The capacitor 131 is connected to the master control point 115 through a clamping diode 132 which assures that the potential at the point 115 is never greater than the potential at the point 131a. However, due to the action of the diode 132, the potential at the point 115 may be less than the potential at the point 131a, since under these conditions the diode 132 will be substantially non-conductive. The point 131a is connected through normally open relay contacts R2 and a resistor 134 to the junction between the resistors 118 and 119 in the voltage divider. The values of the resistors 118 and 119 are so chosen to make the junction therebetween reside at a potential sufficiently low that, if it were applied to the control point 115, the oscillator 30 would cease operation. Thus, when the contacts R1 and R2 are respectively opened and closed, the sweep capacitor 131 discharges toward a low voltage point. The voltage at the terminals 131a and 115 is prevented, however, from falling below a value which makes the blocking oscillator 30 operate at a 5% frequency.

This is accomplished by a voltage divider made up of resistors 136a and 136b connected in series between the +60 volt and −250 volt sources, the resistors being proportioned such that their junction 136c resides at a 5% voltage level. The junction 136c is connected to the control point 115 by a clamping diode 137 poled to become conductive only if the point 115 tends to drop below the voltage of the junction 136c. This means that as the sweep capacitor 131 discharges, the voltages at points 131a and 115 cannot fall below a value which makes the oscillator operate at a 5% frequency, and that frequency is reached without a prolonged asymptotic approach.

RATE ADJUST ACTION

With the foregoing in mind, the apparatus for smoothly decreasing the nominal frequency or rate of interpolated output pulses before the end of a given counting cycle and smoothly increasing such rate or frequency during the beginning of a succeeding counting cycle may now be understood.

Referring to FIG. 2, whenever two successive sets of information supplied to the storage devices 51 and 60 would involve two successive interpolator cycles with a large difference in the frequency or rate of interpolated output pulses, an adjust information signal is generated by a device 140 on a line 141 which sets a bi-state flip-flop 142 to the "0" state. When in the "0" state, the flip-flop 142 supplies a control signal over in line 144 to open a gate 145. The predict terminal 99 (see also FIG. 1b) connects to the input of the gate 145. If opened in response to an information signal from the device 140, the gate 145 will pass the first predict signal on the terminal 99 to a line 146 to set a bi-state flip-flop 148 to the "0" state. Succeeding pulses on the terminal 99 do not affect the circuitry, since the flip-flop 148 is already in the "0" state.

A terminal 148a in the flip-flop 148 resides at, say, −20 volts when the flip-flop is in the "1" state and switches to about +30 volts potential as the flip-flop switches to the "0" state. Assuming that a conductor 149 shown by dashed lines in FIG. 2 is connected in the circuit, this switching of the terminal 148a from a negative to a positive potential will result in an abrupt increase of the potential of a control electrode or grid 150a from below cut-off potential to above cut-off potential. The grid 150a controls the conduction of a thyratron 150 having its cathode connected to a point of ground potential and its anode connected through the coil of the relay R to a positive voltage source here shown conventionally by the symbol B+. Thus, assuming that the conductor 149 is in the circuit of FIG. 2, and that a signal has been received from the device 142 to open the gate 145, as soon as a "predict" pulse appears on the predict terminal 99, the flip-flop 148 will switch to the "0" state and cause the thyratron 150 immediately to begin conduction, thereby energizing the relay R.

Energization of the relay R will result in opening of the contacts R1 and closing of the contacts R2 in FIG. 3. When this occurs, the sweep capacitor 131 will immediately begin discharging through the resistors 134 and 119, producing an exponentially decaying sweep voltage at the point 131a. When the voltage at 131a decreases below the voltage existing at the master control point 115, the diode 132 becomes conductive, so that the capacitor 122 then also discharges by current flow through the diode 132, the resistors 134 and 119. As a result, the voltage at the point 115 decays exponentially, causing the frequency of the blocking oscillator 30 to be gradually reduced. The capacitor 122 is substantially smaller than the capacitor 131 so that the exponential decay rate of the voltage at points 115 and 131a (after the diode 132 becomes conductive) is determined primarily by the size of the capacitor 131 and the resistance of the discharge path. Since the capacitors 131 and 122 discharge until the control point 115 reaches a 5% voltage (clamped by the diode 137), the frequency of the blocking oscillator 30 is reduced smoothly to and held at 5% of its 100% value.

FIG. 3a graphically illustrates this operation. A first curve 155 represents the variation in the sweep potential at point 131a in FIG. 3. Prior to the energization of the relay R, this voltage is at a 125% value. At the instant $t_0$ when the relay R picks up to open the contacts R1 and close the contacts R2, the potential at the point 131a begins exponentially decaying, and gradually decreases to a 5% potential, i.e., a potential which results in operation of the blocking oscillator 30 at 5% of the normal frequency.

Curves 156, 157 and 158 in FIG. 3a illustrate the variation in the master control voltage appearing at the point 115. If the wiper 116a is initially set to a 125% value, then the potential at the point 115 will initially be the same as that at the point 131a. At the instant $t_0$ when the relay R picks up, the "sweep" and "master" potentials appearing at points 131a and 115 will decay in unison as illustrated by the curve 156.

If, however, the potentiometer wiper 116a is set to a 75% position, so that the voltage at the point 115 is initially lower than the voltage at the point 131a, then when the relay R picks up at the time instant $t_0$, the sweep potential appearing at the point 131a will decay exponentially while the master potential at the point 115 initially remains constant. As the sweep potential at the point 131a falls below the original potential of the point 115, however, then the master potential decays in unison with the sweep voltage, due to conduction of the diode 132. This is illustrated by the dashed curve 157 in FIG. 3a.

The curve 158 illustrates the same operation, except with the potentiometer wiper 116a adjusted to the 50% position so that the initial voltage at the point 115 is even lower.

The curves 159, 160 and 161 in FIG. 3a illustrate the manner in which the frequency of the blocking oscillator varies in response to pick-up of the relay R with the potentiometer wiper respectively set initially to 125%, 75% and 50% positions. It will be seen that the frequency of the source 30 varies proportionally or in unison with the master voltage appearing at the point 115, the curves 159–161 corresponding to the curves 156–158, respectively. It should be noted that a delay interval $T_1$ or $T_2$ exists between the instant $t_0$ and the instants when the frequency begins to decrease. This delay is due to the "sweep" action. It is greater ($T_1 < T_2$) in length when the running frequency of the source 30 is set to lower values (75% and 50% for curves 160 and 161).

From the foregoing, it will be understood that prior to the completion of one interpolator counting cycle, a "predict" pulse appearing on the terminal 199 causes energization of the relay R and thus causes the frequency of the pulse source 30 to be smoothly or gradually decreased to a 5% value. This, of course, causes a corresponding gradual decrease in the nominal frequency of the interpolated output pulses which appear on the line 61 (FIG. 1b) during the latter portion of a given counting cycle. The interpolator continues to receive input pulses at the lower, e.g., 5%, frequency until a "full count" is received and a transfer pulse appears on the output terminal 18.

As shown in FIG. 2, the interpolator transfer pulse terminal 18 is connected through an inverter 170 and a coupling capacitor 171 to the control electrode 172a of a discharge device or triode 172. The latter is normally held non-conductive by a resistor 174 connecting its control electrode to a negative bias voltage, represented conventionally as C—. However, as soon as a transfer pulse appears on the terminal 18, the tube 172 conducts heavily. The anode 172b of this tube is connected through two resistors 175 and 176 to a positive voltage source. The junction between these two resistors is connected by a large capacitor 178 to the anode of the thyratron 150. Thus, as soon as the tube 172 begins conduction, the voltage at the anode of the thyratron 150 is dropped abruptly, thereby extinguishing the thyratron. The tube 172 is termed the "reset" tube, since it serves to terminate conduction of the thyratron 150 and thus to cause deenergization of the relay R.

Also, whenever a transfer pulse appears on the terminal 18, it is passed via a line 180 to reset the flip-flops 142 and 148 to the "1" state. This causes the potential of the flip-flop terminal 148a to switch rapidly from, say, +30 volts to —20 volts, thereby dropping the thyratron grid 150a below firing potential. Thus, at the end of any counting cycle the thyratron 150 is extinguished (if it had been conducting) by energization of the reset tube 172, and the flip-flop 148 is reset to place the thyratron grid 150a below firing potential. The relay R is energized in response to a "predict" signal appearing on the terminal 99 (if the device 140 had opened the gate 145), and is deenergized in response to a transfer pulse appearing on the terminal 18.

The effect of the relay R being deenergized may now be explained with reference to FIGS. 3 and 3a. Drop-out of the relay R results in reclosure of the contacts R1 and opening of the contacts R2. As soon as the contacts R1 close, the capacitor 131 begins charging rapidly by current flow through the relatively small resistor 130. This is illustrated in FIG. 3a where the instant $t_1$ corresponds to drop-out of the relay R. It will be seen from the curve portion 155a that the potential appearing across the sweep capacitor 131 rises very rapidly due to charging current flow through the small resistor 130.

As the potential at the point 131a rises rapidly, the potential at the point 115 does not follow because the diode 132 is non-conductive. Rather, the capacitor 122 now begins charging by current flow through resistors 123 and 121. The charging rate of the capacitor 122 is made, by choosing the values of resistors 123 and 121, to be slower than the charging rate of capacitor 131, so that the master potential at the point 115 rises exponentially as shown by the curve portions 156a, 157a, 158a in FIG. 3a. If the potentiometer wiper 116a is set to the 125% position, then the voltage at the point 115 will rise exponentially to a 125% value as indicated by the curve portion 156a. On the other hand, if the wiper 116a is set to 75% or 50% positions, respectively, then the voltage at the point 115 will rise exponentially until it reaches the potential of the wiper 116a, whereupon the diode 120 will become conductive and clamp the voltage at 115 to the potential of the wiper 116a (see curve portions 157a and 158a, respectively).

The curved portions 159a, 160a and 161a in FIG. 3a illustrate the variation in the frequency of the blocking oscillator 30 in response to these changes in the master control voltage at the point 115.

FIGS. 5a and 5b graphically illustrate and compare the operation of the rate-adjusting action without and with the auxiliary sweep voltage produced by the separately controlled capacitor 131. In FIG. 5a, the variation of the frequency of the pulse source 30 if it is set to a running 125% frequency, is illustrated by the dashed curve 180. Prior to the time instant $t_0$ the frequency will be at the maximum running value, e.g., 125% or 100,000 pulses per second, and at the instant $t_0$ when a "predict" pulse is generated and causes pick-up of the relay R, this frequency will begin to decay exponentially. The frequency of the input pulses to the interpolator counter will thus gradually decrease as shown by the curve 180. A greater period of time than that originally scheduled will be necessary before the interpolator counter receives a "full count" and produces a transfer pulse on the terminal 18. However, at some instant $t_1$ in FIG. 5a a transfer pulse will be generated and the frequency of the pulse source will begin to rise as shown by the curve portion 180a.

If, however, as illustrated by a curve 181 in FIG. 5a the potentiometer wiper 116 is initially set so that the pulse source 30 is operating at a 100% frequency, and if at the instant $t_0$ when a "predict" signal is generated, the capacitor 122 were allowed immediately to begin exponentially discharging, then the frequency of the pulse source would begin to decay immediately, as illustrated by the curve 181. The frequency would decay from a 100% to a 5% value by the time instant $t_{01}$, which is earlier than the instant $t_1$. But because the frequency started from a value lower than 125%, the interpolator counter would not at the instant $t_{01}$ have received a "full count." Rather, the frequency of the pulse source 30 would continue at a 5% value until some later time instant $t_2$ when a transfer pulse would result in a gradual increase of this frequency, represented by the curve portion 181a.

Thus, if the master control voltage at the point 115 were allowed to decay exponentially as soon as a "predict" pulse were generated, the pulse source 30 would operate over an extended period $S_1$ at its lowest frequency (here 5%). This would result in a "time stretch" in the operation of the interpolator during a given counting cycle. The lower the adjusted running frequency of the source 30, the greater would be the period of operation at the lowest frequency of input pulses before the completion of a counting cycle. Operation of the source 30 at its lowest frequency is undesirable since it extends the time necessary for the system to process a block of information without contributing to the reduction in the abrupt change in the frequency of the interpolated output pulses. Such "stretching" illustrated by the period $S_1$ is, in keeping with the present invention, materially reduced.

Referring to FIG. 5b, dashed line and solid line curves 182 and 183 illustrate the variation in the frequency of the pulse source 30 with time when the pulse source is adjusted to 125% and 100% running frequencies, respectively, and with the auxiliary sweep voltage being provided by the capacitor 131 and the master control voltage at the point 115 (FIG. 3) clamped by the diode 132. The curve 182 and its rising portion 182a correspond to the curve 180 and rising portion 180a in FIG. 5a. However, the curve 183 indicates that, with a sweep voltage and clamping arrangement of FIG. 3, when a "predict" signal is generated at the time instant $t_0$, the sweep voltage at the point 131a (FIG. 3) will immediately begin an exponential decay represented by a curve 182. However, because the potential at the point 115 is initially lower than a 125% value, the operating frequency of the source 30 will remain at the 100% value for a time interval $T_1$ and until the sweep voltage at 131a falls below the master voltage at 115. At the end of the interval $T_1$, the frequency of the pulse 30 will decay exponentially as indicated by the curve 183, following the exponential curve which would exist if the pulse source had been adjusted originally to a 125% running frequency.

Because the pulse source operates for a longer interval at the full 100% frequency, as indicated by curve 183, the interpolator counter receives a "full count" more quickly after the "predict" pulse than it otherwise would. By the time that the frequency of the source 30 reaches a 5% value at the time instant $t_1$ in FIG. 5b, it has almost received a full count. Thus, the frequency of the source remains at the 5% value for a relatively short interval $S_2$ until a transfer pulse is generated at the time instant $t_2$. When the transfer pulse occurs at the instant $t_2$ the source frequency begins to rise again as indicated by the curve portion 183a due to the charging of the capacitor 122 in FIG. 3.

Comparison of FIGS. 5a and 5b indicates that the "stretch" interval $S_2$ is considerably shorter than the "stretch" interval $S_1$; thus the employment of a sweep voltage to which the master voltage is clamped, as described above in connection with FIG. 3, results in a material saving of time in the completion of a counting cycle which involves rate adjust action.

From FIGS. 5a and 5b it will be apparent that the lower the setting of the running frequency of the pulse source 30 (i.e., the lower the setting of the wiper 116a in FIG. 3), the greater the interval of time at which the source 30 will continue operation at its adjusted frequency before that frequency begins to decay exponentially in synchronism with the sweep voltage. For example, as illustrated by the dot-dash curve 184 in FIG. 5b, if the source 30 is initially adjusted to a 50% setting, then it will continue operation at that setting for a period $T_2$ after the instant $t_0$ before beginning a gradual, smooth decay. The interval $t_2$ is much longer than the interval $T_1$, and results in a lessening of the "time stretching" which would otherwise occur with such a low running frequency of the pulse source 30.

ADJUSTABLE DELAY

Despite the fact that the sweep voltage and the master voltage clamped to it, as explained above, reduce the "stretching" of time which occurs if the pulse source 30 reaches its lowest value too soon, an undesirable amount of such stretching of counting cycles will occur, and this stretching becomes more serious as the running frequency of the clock is adjusted to lower and lower values.

Referring to Tables III and VI, supra, if the input pulses are being supplied to the interpolator counter over the input line 43, thereby establishing a counting cycle which requires 2,000,000 input pulses to be received before a transfer pulse appears on the terminal 18, a "predict" signal will pass through the gate 91 to the terminal 99 after 99.5% of the pulses, i.e., 1,990,000 input pulses are received. If the pulse source 30 is adjusted to 100%, 50% or 25% running frequencies by different settings of the potentiometer wiper 116a (FIG. 3), the scheduled time for the three different counting cycles is correspondingly increased from the nominal 25 second period. That is, with the source 30 set to 100%, 50% or 25% running frequencies, the scheduled time for the three different counting cycles would be 25 seconds, 50 seconds, or 100 seconds, respectively. Since the "predict" pulse appears after 1,990,000 input pulses are received in each case, it is passed to the terminal 99 after 24.875 seconds, 49.75 seconds or 99.5 seconds, respectively. This means that the smooth decrease in the frequency of the pulse source 30 begins approximately .125 seconds, .250 seconds, or .500 seconds, respectively, before the expected termination of the three respective counting cycles. The time required, however, for the smooth decay of the source frequency for the 5% volume is actually smaller in the three successive cases, since the frequency must smoothly drop by amounts of 95%, 45% and 20%, respectively.

In other words, the pulse source 30 will reach its 5% frequency too soon as the running frequency of the source 30 is set to lower values, and by time intervals which are greater as the setting is made lower and lower. Thus, the lower the frequency setting for the source 30, the greater will be the needless time "stretch." And in each case, after the pulse source 30 has reached its 5% value, the interval at which it remains at such value will be longer if the pulse source running frequency is set to a lower value.

In order to overcome this difficulty and eliminate the time stretch caused by the pulse source reaching its lower limit frequency too soon, means are here provided to create a delayed response to a "predict" signal, and to make the duration of the delay increase as the running frequency of the source 30 is set to lower values.

Referring to FIG. 2, the dashed conductor 149 which was referred to in order to simplify the previous description, may now be considered as removed. Therefore, a resistor 190, a potentiometer 191, and a capacitor 192 connected between the flip-flop terminal 148a, and a point of ground potential are now effective. These form a variable time delay means responsive to the switching of the flip-flop 148 from the "1" to the "0" state. With the flip-flop 148 in its "1" state and the terminal 148a at, say, —20 volts potential, the capacitor 192 will be negatively charged. As soon as the flip-flop 148 switches to the "0" state and its terminal 148a switches to, say, +30 volts, the capacitor 192 begins to exponentially charge by current flow through resistors 190 and 191. Accordingly, the potential appearing on the wiper 191a of the potentiometer 191 will exponentially rise from an original voltage of about —20 volts toward a voltage of +30 volts. The control electrode 150a will, therefore, not reach the firing potential to initiate conduction by the thyratron 150 until some time after flip-flop 148 switches from its "1" to its "0" state. The duration of this delay will be increased or decreased as the wiper 191a is set to lower or higher points along the potentiometer 191. Since the wiper 191a is mechanically ganged, as schematically indicated, to the potentiometer wiper 116a in FIG. 3, the delay interval will be increased as the potentiometer 116a is given settings which establish lower running frequencies of the pulse source 30.

When a transfer pulse is received and the flip-flop 148 is reset to its "1" state, the capacitor 192 is quickly discharged and recharged to a negative voltage by current flow through a unidirectionally conductive diode 194. Since this shunts the potentiometer resistance 191, the capacitor 192 may be charged to a negative voltage very quickly. Moreover, a diode 195 is connected directly from the thyratron grid 150a to the flip-flop terminal 148a and poled to conduct current toward the latter terminal. Thus, when the flip-flop 148 switches to its "1" state, a small capacitor 196 connected between the grid and cathode of the thyratron 150 is quickly discharged, so that the grid 150a is quickly returned to a negative potential below cut-off. While the diodes 194 and 195 are not essential, they are of benefit here in assuring that when a transfer pulse is received at the end of a counting cycle, the grid of the thyratron 150 is quickly restored to a negative potential below cut-off.

The operation of the circuit in FIG. 2 can better be understood with reference to the variations plotted against time in FIG. 2a. As shown in FIG. 2a, a "predict" pulse 200 is received on the terminal 99 at a time instant $t_0$. Prior to this instant, the output voltage (curve 201) on the terminal 148a of the flip-flop 148 is at a relatively low, negative potential of —20 volts (curve portion 201a). Also, prior to this time instant $t_0$, the thyratron 150 is cut-off, as indicated by the absence of thyratron current (represented at 204). Still further, the potential (curve 203) of the thyratron grid 150a is well below the firing potential 205, and is in fact at —20 volts indicated by the curve portion 203a.

At the instant $t_0$ when the "predict" pulse 200 is received on the terminal 99, the flip-flop 148 switches from the "1" to the "0" state, and its terminal 148a rises quickly from —20 volts to +30 volts. When this occurs, the capacitor 192, which was previously charged negatively, begins to charge positively by current flow through the resistor 196 and the potentiometer 191 (FIG. 2). The potential of the wiper 191 which corresponds substantially to the potential of the thyratron grid 150a, thus begins to rise exponentially at the time instant $t_0$ when the "predict" pulse 200 is received. If the wiper 191a is set at a relatively high point on the potentiometer 191, the potential of the grid 150a will rise exponentially, but fairly fast as indicated by the dashed curved portion 203b in FIG. 2a. If the wiper 191a is set to an intermediate point on the potentiometer 191, the potential of the grid 150a will rise exponentially, but at a slower rate indicated by the solid line curve portion 203c. Finally, if the wiper 191a is set to a low point on the potentiometer 191, the potential of the grid 150a will rise exponentially, and fairly slowly as indicated by the curve portion 203d. The three curve portions 203b, 203c and 203d cross the thyratron firing potential 205 at the time instants $t_1$, $t_2$ and $t_3$, respectively, so that the thyratron 150 begins conduction after delay intervals $D_a$, $D_b$ and $D_c$, from the occurrence of the transfer pulse 200, depending upon the setting of the wiper 191a. The curve 204, which represents current conducted by the thyratron 150 shows that the relay R will be energized at the time instants $t_1$, $t_2$, or $t_3$ if the wiper 191a has been given the three respective positions mentioned above. Thus, the delay intervals $D_a$, $D_b$ and $D_c$ between the instant a transfer pulse is received by the circuit of FIG. 2 and the instant that the relay R is energized, depend upon the setting which the potentiometer wiper 191a has. Since, as previously noted, this wiper 191a is mechanically ganged to the wiper 116a in FIG. 3, the delay interval between a "predict" pulse and pick-up of the relay R will be decreased as the adjusted running frequency of the pulse source 30 is increased.

FIG. 2a also indicates that at the instant $t_4$ a transfer pulse 208 is received on the transfer pulse terminal 18 (FIG. 2). Since this causes the reset tube 172 to conduct, and thus lowers the plate potential of the thyratron 150 (see curve 204), the relay R drops out substantially at the time instant $t_4$. Moreover, since the transfer pulse resets the flip-flop 148 to its "1" state, the potential of the output terminal 148a drops abruptly from the +30 to the —20 volt value at the time instant $t_4$ (see curve 201). Still further, when the potential of the flip-flop output terminal 148a drops, the diodes 194 and 195 become conductive so that the potential of the thyratron grid 150a drops almost immediately (as illustrated by the curve portion 203e) to the —20 volt level. The diode 194 permits the capacitor 192 to discharge quickly until it is negatively charged to a —20 volt level.

FIGS. 6a, 6b and 6c graphically show the advantageous result produced by the variable delay means of FIG. 2. FIG. 6a illustrates the variation in the sweep voltage and frequency of the pulse source 30 if the running frequency of that source is initially adjusted to a 125% setting, so that the capacitor 192 and potentiometer 191 (FIG. 2) produce almost no delay. The portion 210a of curve 210 indicates that prior to a time instant $t_0$ the sweep voltage and source frequency both have 125% value. At the time instant $t_0$, when a "predict" signal appears on the terminal 99 (FIG. 2), the sweep voltage and source frequency will both decay exponentially (curve portion 210b) until they reach a 5% value. At a later time instant $t_1$, a transfer pulse will be received so that the sweep voltage will increase exponentially (curve portion 210c), while the frequency of the source 30 will increase exponentially, but more slowly, as indicated at 210d. For simplicity of illustration, it has been assumed in preparing the curve 210 of FIG. 6a that the resistor 190 is negligible and that with the wiper 191a set to the upper end of the potentiometer 191, substantially zero delay elapses between the instant that the flip-flop terminal 148a rises positively and the instant that the thyratron 150 fires.

Referring next to FIG. 6b, the operation of the circuit in FIG. 2 is there illustrated with the assumption that the wiper 191a is set to the midportion of the potentiometer 191, corresponding to the wiper 116a in FIG. 3 being set to the 100% point on the potentiometer 116. The solid line curve 211 in FIG. 6b represents the sweep voltage which appears across the sweep capacitor 131 in FIG. 3. The dotted line curve at 212 in FIG. 6b represents the frequency of the pulse source 30. If a predict pulse occurs at the time instant $t_0$ (FIG. 6b), the flip-flop 148 is set to its "0" state at that instant. However, the sweep voltage remains at the 125% value because the relay R is not energized at such instant. Rather, a time period $D_1$ elapses until the time instant $t_{01}$, at which time the thyratron 150 fires to pick up the relay R, to actuate the contacts R1, R2 (FIG. 3), and to cause the sweep voltage to decay exponentially as indicated at 211a. The delay means in FIG. 2, therefore, creates the delay interval $D_1$ between the instant of a transfer pulse and the instant at which the sweep voltage begins to decay exponentially.

However, the frequency of the pulse source 30 does not change at the instant $t_{01}$. This is because the potential at the control point 115 (FIG. 3) is below the 125% value. Therefore, the frequency of the pulse source 30 begins to decay, as represented by the curve portion 212b at the time instant $t_{02}$, which is delayed from the instant $t_{01}$ by an interval $T_1$. As a result, the frequency of the pulse source 30 reaches the 5% value only a short time before a transfer pulse appears at the time instant $t_2$ (FIG. 6b). The pulse source frequency does not remain at its 5% value for an extended period of time before the interpolator counter produces the transfer pulse.

Noteworthy is the fact that the transfer pulse at instant $t_2$ in FIG. 6b occurs almost immediately after the source frequency reaches its 5% value, just as in the case of FIG. 6a where the transfer pulse occurs at instant $t_1$ immediately after the source frequency reaches its 5% value. Even though the running frequency of the source 30 is lower in the case of FIG. 6b, as compared to the case of FIG. 6a, there is no protracted "time stretch," i.e., extended operation to complete a counting cycle after the source frequency has been reduced to its lowest value.

FIG. 6c is similar to FIG. 6b, having curves 214 and 215 representing variations of the sweep voltage and pulse source frequency with time, except with the assumption that the potentiometer wipers 191a and 116a have been set to positions which make the running frequency of the pulse source 50% or one-half of the normal value. Under these circumstances, if a transfer pulse appears at the instant $t_0$, the sweep voltage remains at the 125% value for a delay interval $D_2$ until the instant $t_{01}$. It will be seen that the delay interval $D_2$ is greater than the delay interval $D_1$ in FIG. 6b, so that the pulse source 30 continues its operation at the adjusted running frequency (assumed here as 50%) for a greater period of time. At the instant $t_{01}$, the thyratron 150 fires and the relay R is energized, thus causing the sweep voltage to decay exponentially as shown by the curve 214 in FIG. 6c. However, the frequency of the source 30 remains at the 50% value until the instant $t_{02}$ when the sweep voltage reaches and falls below the voltage which existed on the control point 115 (FIG. 3). After the instant $t_{02}$, the frequency of the source 30 decreases exponentially along with the sweep voltage until a transfer pulse is produced at the instant $t_3$.

Because the pulse source 30 continues to operate at its adjusted running frequency for the delay interval $D_2$ and the time interval $T_2$ after the occurrence of a "predict" pulse, the interpolator counter continues to receive pulses at a relatively high frequency even after the predict signal is received. Thus, once the frequency of the pulse source begins to smoothly decrease, it reaches the 5% level only shortly before the transfer pulse is generated by the interpolator counter. This occurs at the instant $t_3$ in FIG. 6c and is followed by exponential increases in the sweep voltage and source frequency represented by the curve portions 214d and 215d. Here again, the delay $D_2$ produced by the delay means of FIG. 2 makes the period of operation after the source frequency reaches a 5% value very short, eliminating objectionable time "stretching" which would otherwise occur. Thus, FIGS. 6a, 6b and 6c illustrate that through the provision of means for delaying the response to a "predict" signal and of means for making the delay vary inversely with the running frequency of the pulse source, the objectionable time stretching is so reduced as to become negligible.

SPECIAL DELAY FOR SHORT COUNTING CYCLES

Although the effects of the time stretching are largely alleviated by the sweep voltage action and adjustable delay action described above, one serious problem remains. There must in any counting cycle be a "predict" interval sufficiently long to allow for a smooth reduction in the frequency of the pulse source 30 from its maximum adjusted running frequency to some selected, low value here indicated above by way of example, as 5%. That minimum interval is arbitrarily designated in a previous description as 0.125 second. The shortest nominal time period for a counting cycle is, as indicated in Table III, supra, 0.125 second. This means that if rate adjust action is to occur during a 0.125 second counting cycle, the 'predict" signal will appear at the very beginning of the cycle.

This is indeed the effect produced by the output line 88 of the matrix M (FIG. 1b), since the latter is connected to none of the matrix input lines and is always at ground potential. Disregarding for the moment the logical AND device 220 shown adjacent the gate 98 in FIG. 1b, that gate is always open and the first input pulse appearing on the input line 50 will be passed as a "predict" signal to the terminal 99. If the frequency of the pulse source has not been reduced to 5% at the end of the preceding counting cycle, this allows a sufficiently long "predict" interval for it to be reduced to the 5% value before the end of the 0.125 second counting cycle.

However, if the source 30 has been reduced to 5% frequency at the end of the previous counting cycle and the relay R is energized at the beginning of or very early in a succeeding 0.125 second cycle, the master potential at the point 115 (FIG. 3) will not be able to rise appareciably, or will simply remain at the 5% voltage. Thus, the pulse source 30 will continue operation at the 5% frequency during the entire counting cycle. This means that a total of 10,000 input pulses must be received from the pulse source 31 operating during the entire cycle at a frequency of 4,000 pulses per second, and that a total of 2.5 seconds would be required to complete a counting cycle which, under normal conditions, would occupy only 0.125 second. Such extreme "stretching" by a factor of 20 to 1 of short counting time cycles, is extremely undesirable.

In order to overcome this difficulty, provision is here made to delay the appearance of, or the response to, a "predict" signal (a) if the cycle is a short one, and (b) if the previous counting cycle involved rate adjust action, that is, if the pulse source 30 is already at its lower limit frequency when the short cycle begins.

As here illustrated in FIG. 1b, the gate 98 for creating "predict" signals during the shortest or 0.125 second counting cycles, is controlled by the logical AND device 220, the latter having two inputs. The first input is the output line 88 of the "predict" matrix and which is always at a high or zero volt potential. Nevertheless, it would be possible for the output line 88 to be controlled by diodes connected to different ones of the matrix input lines. The second input to the AND device 220 comes from a delay element 221 which receives a signal from the rate adjust control 100. This signal causes the gate 98 to be closed at the beginning of a counting cycle if the preceding counting cycle has involved rate adjust action and the pulse source 30 is already reduced to its 5% frequency. In the latter case, the signal from the rate adjust control 100 opens the gate 98 only after a delay interval from the beginning of a counting cycle.

An exemplary detailed circuit which makes the arrangement shown in FIG. 1b more readily understandable is shown in FIG. 4. The gate 98 is illustrated as a pentagrid vacuum tube having first and second control electrodes 98a and 98b. The second control electrode 98b receives input pulses from the source 30 over the input line 50 whenever the interpolator counter is set to produce counting cycles of 0.125 second nominal duration. The second control electrode 98a receives a control potential from the AND device 220 which is here shown as having a first input terminal 220a, and a second input terminal 220b. Only if the control electrode 98a is at approximately zero volts potential, or above, will pulses received on the control electrode 98b be amplified by the gate tube 98 and passed from an output terminal 98c to the "predict" terminal 99.

The first input terminal 220a of the AND device 220 is the matrix output line 88 (compare FIGS. 1b and 4). Thus, FIG. 4 includes as a part of the circuits illustrated the resistor 88a associated with the output line 88 of the matrix M. As previously explained, in the particular form here illustrated, the output line 88 is always substantially at ground potential, because the resistor 88a is connected to ground and little current flows therethrough. Under these circumstances, the gate tube 98 will be "open."

However, the relay R which forms a part of the rate adjust control (FIG. 1b) and which is controlled by the circuitry shown in FIG. 2, also has normally open contacts R3 connected in the circuit of FIG. 4. So long as these contacts are open a capacitor 229, forming a part of the delay means 220, will be charged positively through a resistor 230 connected to a positive voltage source here shown conventionally by the symbol B+. Thus the point 220b will also be at a relatively high potential, and the gate tube 98 will be "open" to pass pulses received over the input line 50.

If during a given counting cycle of the interpolator rate adjust action occurs and the relay R is energized (as previously explained), the contacts R3 will be closed, thereby connecting a resistor 231 in series with the resistor 230 between the B+ potential and a negative source potential here shown by the symbol C—. The source potentials and the relative magnitudes of the two resistors 230 and 231 will make their junction reside at a negative potential (e.g. —22 volts) relative to ground. Thus the capacitor 229 will be very quickly charged to a negative potential, and the point 220b will be negative with respect to ground. Accordingly, current will flow through the resistor 88 and a diode 232, resulting in the control electrode 98a being held below cut-off potential. The gate tube 98 will thus be closed.

When the counting cycle is completed, however, the relay contacts R3 will open. When this occurs, the capacitor 229 will recharge by current flow through the resistor 230 to a positive potential approximating the B+ source voltage. Accordingly, the diode 232 will be made nonconductive and current flow through the resistor 88a will be terminated. The control electrode 98a will, therefore, be held at about zero volts potential and the gate tube 98 "opened." This exponential charging of the capacitor 229, however, creates a time delay between the instant that contacts R3 open and the instant that the potential of the grid 98a reaches a conduction level.

Thus, the circuit of FIG. 4 operates to prevent "predict" pulses from being established on the "predict" terminal 99 during any .125 second time cycle if there has been rate adjust action in the preceding cycle (and the relay R energized) and until a predetermined time delay has expired after the beginning of the .125 second counting cycle.

On the other hand, if a preceding counting cycle involves no rate adjust action so that the contacts R3 have not been closed just prior to initiation of a succeeding .125 second counting cycle, then the gate tube 98 is open at the very beginning of the .125 second cycle, and the first input pulse received on the line 50 will pass therethrough to form the "predict" signal on the terminal 99.

FIGS. 7a and 7b illustrate the operation of the present apparatus in producing short counting cycles with and without the special delay means described above in connection with FIG. 4. The curve 240 represents the variations in the frequency of the pulse source 30 during two successive counting cycles. Let it be assumed that at the time instant $t_0$ during a first counting cycle a "predict" signal is generated and that the frequency of the pulse signal source 30 gradually decreases as indicated by the curve portion 240a. At the time instant $t_1$ a transfer pulse occurs signifying the end of the first counting cycle. Without the delay means of FIG. 4, if the next counting cycle is a 0.125 second nominal time period cycle, then the first input pulse to the interpolator will also cause a "predict" pulse on the terminal 99, so that the relay R in FIG. 3 would be picked up a second time just as soon as it dropped out. Thus, the frequency of the pulse source 30 would remain at a 5% value represented by the curve portion 240b in FIG. 7a during one entire .125 second cycle. Because the pulse source 30 is operating at a 5% frequency instead of a 100% frequency during this cycle, a transfer pulse would not occur until the time instant $t_2$, 2.5 seconds after the time instant $t_1$, instead of the scheduled 0.125 second. Thus, FIG. 7a illustrates the extreme degree of time "stretching" which would occur if the special delay means of FIG. 4 were not employed.

FIG. 7b, by contrast, shows the action of the apparatus with the delay means of FIG. 4. A curve 241 illustrates the variation the frequency of the pulse source 30 during two successive counting cycles. During the first counting cycle, a "predict" pulse is created at the instant $t_0$ resulting in the source frequency decaying expotentially at 241a. The relay R is picked up to close the contacts R3 (FIG. 4) at the instant $t_1$, so that the capacitor 229 is quickly charged to a negative voltage, closing the gate 98.

At the instant $t_1$ a transfer pulse occurs, the frequency having by this time reached a 5% value. Also, at the instant $t_1$ the relay R (FIG. 2) is deenergized and the contacts R3 (FIG. 4) open. When the contacts R3 reopen at the time instant $t_1$, the capacitor 229 begins charging through the resistor 230, and the control electrode 98a does not rise above cut-off potential until the time instant $t_4$. During this delay interval $L_1$ between the instant $t_1$ and $t_4$, the capacitor 122 (FIG. 3) is being charged, and the master voltage at the point 115 is rising expotentially. Accordingly, the pulse source frequency arises expotentially as illustrated at 241b in FIG. 7b.

Then, at the time instant $t_4$ the gate tube 98 becomes conductive, and one of the input pulses appearing on the line 50 passes therethrough to the "predict" terminal 99. At this instant, therefore, the relay R is reenergized so that the contacts R1 and R2 (FIG. 3) respectively open and close, thereby causing the frequency of the pulse source 30 to begin decaying again as illustrated by the curve portion 241c in FIG. 7b.

It will be apparent from comparing FIGS. 7a and 7b that the pulse source 31 has operated at a higher average frequency cycle owing to the fact that its frequency rose at 241b and then fell again at 241c. As a result, less time is required for the interpolator counter to receive the necessary number of input pulses to produce a transfer pulse at the time instant $t_2$ (FIG. 7b). Thus, the scheduled .125 second cycle is completed in a time interval of approximately 0.5 second, as contrasted with 2.5 seconds in FIG. 7a. The delay means 221 FIG. 4 materially reduces the "stretching" which would otherwise exist for short counting cycles involving rate adjust action and following counting cycles having rate adjust action.

FIGS. 7a and 7b have been simplified for purposes of illustration, and do not show the effects of the sweep voltage and adjustable delay means previously described. FIG. 8 is intended to illustrate the combined action of the special delay means of FIG. 4, the sweep voltage means of FIG. 3 and the adjustable delay means of FIG. 2 during a .125 second nominal time period cycle. The variations in the sweep voltage appearing on the capacitor 131 (FIG. 3) are represented by a dashed curve 245, the variations in the master voltage appearing across the capacitor 122 (FIG. 3) and the corresponding variations in the frequency of the pulse source 30 are represented by a solid line curve 246. It is assumed that the running frequency of the pulse source 30 is set to a 100% value and that a "predict" pulse is passed to the terminal 99 at the instant $t_0$ during the first counting cycle.

After a delay D3 (FIG. 8) from the instant $t_0$ that a "predict" pulse occurs (and at the instant $t_1$) the relay R is energized to actuate its contacts. This delay D3 is created by the adjustable delay circuit made up of the capacitor 192, the potentiometer 191, and its associated wiper 191a which connects the flip-flop terminal 148a to the control grid 150a of the thyratron 150 (FIG. 2). At the time instant $t_1$ when the relay R is energized, the sweep capacitor 131 (FIG. 3) begins discharging through the contacts R2 so that the sweep voltage falls expotentially as illustrated by the curve portion 245a. As soon as the sweep voltage appearing at the point 131a falls below the 100% control voltage which existed at the control point 115 (FIG. 3), then the frequency of the pulse source 30 begins to decay expotentially with the sweep voltage as represented by the curve puortion 246a in FIG. 8. It will be note that even after the time instant $t_1$ when the relay R picks up, a delay period $T_4$ must elapse before the frequency of the pulse source begins to decrease.

At the time instant $t_3$ in FIG. 8, it is assumed that a transfer pulse is produced by the interpolator. This means that the re-set tube 172 (FIG. 2) extinguishes the thyratron 150 and causes the relay R to drop out. Thus, the contacts R3 which have been closed to charge the capacitor 229 (FIG. 4) negatively and close the gate tube 98, now reopen at the instant $t_3$. Moreover, at the $t_3$ when the contacts R1 and R2 (FIG. 3) restore, the capacitor 131 begins charging quickly through the resistor 130 so that the sweep voltage at point 131a rise expotentially, but very fast as indicated by the curve portion 245b in FIG. 8. Still further, at the time instant $t_3$, the capacitor 122 begins charging expotentially, but relatively slowly through the resistors 121 and 123 (FIG. 3) so that the control potential at point 115 rises expotentially, and the frequency of the pulse source 30 rises expotentially as indicated by the curve portion 246b in FIG. 8.

Still further, very shortly after time instant $t_3$ input pulses are being supplied to the interpolator counter over the input line 50, which establishes a nominal .125 second counting cycle. These cannot, however, pass through the gate 98 because the latter is being held closed. Now, since the contacts R3 opened at the istant $t_3$, the capacitor 229 begins charging positively by current flow through the resistor 230 (FIG. 4). After a predetermined time delay $L_1$ necessary for the capacitor 229 to charge sufficently to raise the point 220b to zero volts potential, the gate tube 98 becomes conductive and a predict pulse is passed from the line 50 through the gate 98 to the "predict" terminal 99. This occurs at the time instant $t_4$ illustrated in FIG. 8, that is, the first predict pulse does not reach the terminal 99 until a delay $L_1$ from the instant $t_3$ of the preceding transfer pulse has elapsed.

When the predict pulse reaches the terminal 99 (FIG. 2), a certain delay $D_4$ equal to the delay $D_3$ (FIG. 8) is created by the delay means 191, 191a, 192 before the thyratron 150 is fired to energize the relay R. Thus the relay R is picked up at the time instant $t_5$ shown in FIG. 8. This actuates the contacts R1 and R2 (FIG. 3) so that the sweep capacitor 131 begins discharging and the sweep voltage begins falling expotentially as illustrated by the curve portion 245c (FIG. 8). However, between the time instants $t_5$ and $t_6$ shown in FIG. 8, capacitor 122 continues to charge and the frequency of the source 30 continues to rise expotentially as shown at 246b. At the time instant $t_6$ however, the sweep voltage varying as at 245c reaches and starts to fall below the control voltage appearing at the point 115 in FIG. 3. Thereafter, the diode 132 (FIG. 3) becomes conductive so that the control voltage at the point 115 now begins to fall expotentially. This causes the frequency of the source 30 to drop expotentially, as illustrated by the curve portion 246c (FIG. 8). At the time instant $t_7$ (FIG. 8) the frequency of the source 30 has reached the 5% level, and shortly thereafter, at the time instant $t_8$ a transfer pulse is generated by the interpolater counter.

The total time interval between the beginning instant, $t_3$, and the ending instant, $t_8$, of the nominal .125 second time cycle is only silghtly "stretched" and may involve, for example, about .40 second. The reduction in "stretching" from an interval of 2.5 seconds (FIG. 7a) to an interval of only about .40 second comes about as a result of a combined action of the sweep voltage creating the delay period $T_5$, the adjustable delay means of FIG. 2 creating the delay period $D_4$, and the special delay means of FIG. 4 creating the delay period $L_1$ (FIG. 8).

From the foregoing description of the apparatus and operation of the improved predicting and rate adjust means for data processing systems, it will be apparent that significant advantages are achieved, particularly in that predict signals are produced with greater reliability, and time "stretching" which might otherwise occur is minimized or greatly reduced. Yet, the apparatus required to bring about these improvements is in itself relatively simple and inexpensive so that the present invention brings to this art greatly improved operational results and advantages with little additional cost or complexity.

We claim as our invention:

1. In data processing apparatus, the combination comprising a source of recurring signals, means for adjusting the running frequency of said source, a counter having a plurality of bi-state elements and means connecting the same in tandem counting relationship, a plurality of input lines leading to different ones of the first several bi-state elements in said counter, means for selectively supplying signals from said source over any one of said input lines so that different preselected numbers of signals are required to complete a counting cycle, a plurality of AND circuits each having one output and having plural inputs controlled according to the states of respective ones of a different plurality of the last few elements in said counter, each said AND circuit having means to produce on its output a gate-enabling signal only if the elements connected to its inputs are all in a predetermined one of two possible states, a plurality of gates each having a first input connected to respective ones of said input lines and second inputs connected to respective ones of said AND circuit outputs, said gates having a common predict output, an adjustable time delay means connected to respond to predict signals appearing on the said common output of said gates, means for adjusting the duration of the delay interval of said time delay means in inverse fashion relative to adjustments in said running frequency, and means responsive to the output of said time delay means for smoothly reducing the frequency of said source to a predetermined lower limit.

2. In data processing apparatus, the combination comprising a source of recurring signals, means for adjusting the running frequency of said source, a counter having a plurality of bi-state elements and means connecting the same in tandem counting relationship, a plurality of input lines leading to different ones of the first several bi-state elements in said counter, means for selectively supplying signals from said source over any one of said input lines so that different preselected numbers of signals are required to complete a counting cycle, means for creating a first signal adjustable within upper and lower limits, means for creating a second signal which is normally at said upper limit, adjustable time delay means connected to said predict output and responsive to signals thereon, means for adjusting the delay period of said delay means inversely with changes in the adjusted value of said first signal, means responsive to the output of said time delay means for causing said second signal to smoothly decrease to said lower limit, means creating a control signal having a value proportional to the lesser of said first and second signals, and means for causing the frequency of said source to vary with said control signal.

3. Apparatus for signalling when predetermined percentages of respective ones of a plurality of preselected numbers of recurring signals have been received, such apparatus comprising, in combination, a counter having a plurality of bi-state elements and means connecting the same in tandem scaling relation, means for routing said recurring signals selectively to different ones of said bi-state elements thereby to preselect the number of recurring signals which must be received for one counting cycle of said counter, a plurality of AND devices, first means for partially conditioning respective ones of said AND devices when said routing means sends said signals to corresponding ones of said bi-state elements, second means for partially conditioning respective ones of said AND devices when different combinations of said bi-state elements are all in a particular state, a common output for all said AND devices, and means for causing each AND device to produce a predict signal at said common output when such AND device is partially conditioned by both said first and second means.

4. Apparatus for signalling the instant at which predetermined percentages of different preselected numbers of recurring signals have been received, such apparatus comprising, in combination, a counting chain having a plurality of bi-state elements and means connecting the same in tandem counting relation, said counting chain having a plurality of input lines each of which establishes a different number of signals which must be received thereover before the chain resets, means for applying the recurring signals to any selected one of said input lines, a plurality of logical AND devices each having a plurality of inputs, means connecting one input of each AND device to a corresponding one of said input lines, and means connecting the remaining inputs of each AND device to sense the states of different combinations of the bi-state elements, whereby one of said AND devices will produce a predict response when a predetermined percentage of any preselected number of recurring signals has been received.

5. The combination set forth in claim 4 further characterized in that each said bi-state element includes a terminal and means for making that terminal relatively high or low in potential when the element is in the "1" or "0" state, respectively, and said AND devices each comprise a plurality of diodes connected with like polarity between the said terminals of a different combination of said bi-state elements and a resistor leading to a point of high potential, whereby all of said diodes become non-conductive to preclude a voltage drop across the resistor when the combination of elements connected therewith are all in the "1" state.

6. The combination set forth in claim 5 further characterized in that each of said AND devices includes a normally closed gate, each gate receiving the recurring pulses which appear on a corresponding one of said input lines, and means for opening said gate in the absence of a voltage drop across the corresponding resistor.

7. Apparatus for signalling the instant at which predetermined percentages of different preselected numbers of recurring signals have been received, such apparatus comprising, in combination, a counter having a plurality of bi-state elements and means connecting the same in tandem counting relation, said counter having a plurality of input lines each of which establishes a different counting ratio, means for selectively applying the recurring signals to different ones of said input lines, a plurality of normally closed gates each corresponding to one of said input lines, means for supplying the recurring signals to that gate which corresponds to the selected input line, and means for opening each of said gates when a different predetermined combinaton of the last few elements in said chain are all in a preselected state, so that one of said gates passes a signal before the last bi-state element in said chain produces a transfer pulse indicative of a full count.

8. Apparatus for signalling that any one of several selectable time periods are within respective predetermined percentages of expiration, comprising the combination of a counter having a plurality of bi-state elements and means connecting the same in counting relationship, a plurality of input lines leading to different ones of the first several bi-state elements in said counter, means for supplying recurring signals over any one of said input lines so that different preselected numbers of signals are required to complete a counting cycle, a plurality of AND circuits each having one output and having plural inputs controlled according to the states of respective ones of a different plurality of the last few elements in said counter, each said AND circuit having means to produce on its output a gate-enabling signal only if the elements connected to its inputs are all in a predetermined one of the two possible states, a plurality of gates each having a first input connected to respective ones of said input lines and second inputs connected to respective ones of said AND circuit outputs, said gates having a common predict output, whereby one of said recurring signals is passed to said common output when different predetermined percentages of the different preselected numbers of signals have been received.

9. The combination comprising a counting chain having a plurality of bi-state elements connected in tandem relation and a plurality of input lines for selectively receiving recurring signals and routing them to different ones of the first several bi-state elements so that the time period between the initiation of a counting cycle and a transfer pulse from the last bi-state element depends upon which input line receives the recurring signals, a plurality of gates each having first and second inputs, the first inputs of said gates being connected to respective ones of said input lines, a switching matrix having a plurality of input lines and a plurality of output lines, said matrix input lines being connected respectively to different ones of the last few bi-state elements in said chain, said matrix output lines being connected to respective ones of the second inputs of said gates, said matrix having means to supply an enabling signal over different ones of said output lines as said counting chain reaches different predetermined percentages of a full count, so that one of said gates passes one of said recurring signals a predetermined interval before the end of any time period.

10. The combination comprising an interpolator counter, a source of recurring signals connected to the counter, means for adjusting the running frequency of said source, means for producing a predict signal when the interpolator is within a predetermined percentage of completion of a counting cycle, means for smoothly decreasing the frequency of said source from its adjusted running frequency to a lower frequency, variable time delay means for transferring said predict signal to said frequency-decreasing means to initiate operation of the latter, and means for increasing or decreasing the delay interval of said delay means as an incident to adjustments which respectively decrease or increase the running frequency of said source.

11. The combination comprising a source of recurring signals, means for adjusting the running frequency of said source, a counter connected to said source and having means to count different preselected numbers of said signals during successive counting cycles, means associated with said counter for producing a predict signal when the counter has received a predetermined percentage of any of said preselected numbers of recurring signals, means for smoothly reducing the frequency of said source from the adjusted running value to a lower value, an adjustable time delay device, means for transferring said predict signal through said delay device to initiate operation of said frequency-reducing means, and means for causing the duration of the time delay created by said device to be changed inversely according to the adjustments in the running frequency of said source.

12. For use with an interpolator adapted to count a predetermined number of recurring signals received from an adjustable frequency source, means for setting the running frequency of said source to any value within a range above and below a nominal value, and means for producing a predict signal when the interpolator has received a predetermined percentage of the predetermined number of the recurring signals, that improvement which comprises means for smoothly decreasing the frequency of said source from its adjusted running value to a predetermined lower value, a capacitor and a resistor, means for charging said capacitor through said resistor in response to a predict signal, means responsive to the charge on said capacitor reaching a predetermined value for causing operation of said frequency-decreasing-means, and means to discharge said capacitor when the counter has received the predetermined number of recurring signals.

13. The combination set forth in claim 12 further including means for adjusting the time constant of charging of said capacitor through said resistor.

14. The combination set forth in claim 13 further characterized by means to operate said time constant adjusting means as an incident to adjustments in the setting of the running frequency of said source and in a manner to change the time constant inversely according to changes in the frequency of said source.

15. The combination set forth in claim 12 further characterized in that said capacitor discharging means does not include said resistor and has a lower time constant than that of said resistor and capacitor.

16. In a data processing system having means for repeatedly counting predetermined numbers of recurring signals from an adjustable frequency source, said source having means for making the frequency thereof vary with the value of a controlling signal, and means for producing a predict signal when the interpolator has received a predetermined percentage of any predetermined number of the recurring signals, the improvement comprising, in combination, adjustable means for creating a control signal adjustable over a range between upper and lower limits, means for supplying said control signal to said source as the controlling signal therefor, means for smoothly decreasing said control signal from its adjusted value to said lower limit, an adjustable time delay device, means for transferring said predict signal through said delay device to initiate operation of said control signal-decreasing means, and means for interconnecting control signal-creating means and said time delay device to make the delay interval of the latter change inversely with changes in the adjusted value of said control signal.

17. For use with an interpolator adapted to count a predetermined number of recurring signals received from an adjustable frequency source, means for setting the running frequency of said source to any value within a range above and below a nominal value, and means for producing a predict signal when the interpolator has received a predetermined percentage of the predetermined number of the recurring signals, that improvement which comprises adjustable time delay means connected to respond to a predict signal, means for adjusting the delay interval afforded by said delay means in an inverse fashion as the running frequency of said source is set to different values, means actuated by the response of said delay means for causing a sweep signal to decrease gradually between two values corresponding to the upper and lower limits of said frequency range, and means for causing the frequency of said source to vary with the value of said sweep signal whenever the latter falls below a value corresponding to the adjusted running frequency of said source.

18. In a data processing system having means for repeatedly counting predetermined numbers of recurring signals from an adjustable frequency source, said source having means for making the frequency thereof vary with the value of a controlling signal, and means for producing a predict signal when the interpolator has received a predetermined percentage of any predetermined number of the recurring signals, the improvement comprising, in combination, means for creating a first signal adjustable within upper and lower limits, means for creating a second signal which is normally at said upper limit, adjustable time delay means connected to receive said predict signal, means for adjusting the delay period of said delay means inversely with changes in the adjusted value of said first signal, means responsive to the output of said time delay means for causing said second signal to decrease smoothly to said lower limit, means for creating a control signal having a value proportional to the lesser of said first and second signals, and means for supplying said control signal to said source as the controlling signal therefor.

19. The combination set forth in claim 18 further characterized in that said first signal is adjustable to establish the running frequency of said source in response to manual positioning of a first movable element, and the delay interval of said time delay means is changed according to the position of the second movable element ganged to said first movable element.

20. The combination set forth in claim 18 further characterized in that the decrease in said second signal is produced by a charged R-C circuit and means for discharging the same in response to the output of said time delay means.

21. The combination set forth in claim 18 further characterized by means for rapidly restoring said second signal to said upper limit in response to the interpolator receiving the predetermined number of said recurring signals.

22. The combination set forth in claim 18 further characterized by means for causing said control signal to gradually increase back to the value of said first signal in response to the interpolator receiving the predetermined number of recurring signals.

23. For use with an interpolator adapted to count a predetermined number of recurring signals received from an adjustable frequency source, said source operating at a frequency dependent upon the magnitude of a controlling voltage, and means for producing a predict signal when the interpolator has received a predetermined percentage of the predetermined number of the recurring signals, that improvement which comprises, in combination, a device for creating an adjustable voltage, an adjustable time delay device connected to receive said predict signal, means interconnecting said devices to make the delay interval of the last-named device change inversely with changes in the adjustable voltage produced by the first-named device, means responsive to the output of said delay device for causing a sweep voltage to decrease gradually from one value to another, means for creating a control voltage which is always equal to the lesser of said adjustable and sweep voltages, and means for supplying said control voltage to said source as the frequency controlling voltage therefor.

24. In data processing apparatus adapted to produce successive sets of time spaced pulses which by their number and frequency within each set corresponds to the extent of change and rate of change of a variable condition, the combination comprising a pulse interpolator having a plurality of bi-state elements connected in tandem counting relation, a variable frequency pulse source connected to said interpolator and having means responsive to the magnitude of a controlling voltage for determining the frequency of operation, means for creating a predict signal when said interpolator has received a predetermined percentage of a full count of pulses, a first capacitor, means for creating a manually adjustable voltage across said first capacitor, a second capacitor, means for charging said second capacitor to a second voltage at least equal to the highest possible voltage across said first capacitor, an adjustable time delay device connected to respond to a predict signal, means for causing the delay interval of said device to increase with decreases in said adjustable voltage and vice versa, means responsive to the output of said delay device for exponentially discharging said second capacitor to a lower limit voltage, means for clamp-connecting said first and second capacitors so that the voltage across the first is never greater than the voltage across the second, means for supplying the voltage across said first capacitor as the controlling voltage to said pulse source, and means for charging said first and second capacitors at respectively lower and higher rates in response to said interpolator receiving a full count of pulses.

25. In a data processing system having an interpolator for producing different preselected numbers of time-spaced output pulses at different frequencies in succeeding time periods, the combination comprising means for selectively producing a predict signal normally a predetermined predict interval in advance of the expiration of any time period, means responsive to said predict signal for causing the frequency of said output pulses to be gradually decreased a certain percentage below their original frequency, means responsive to the interpolator completing production of any preselected number of output pulses for causing said frequency to be gradually increased to the original value, means for sensing whether the frequency of the interpolator output pulses has been reduced at the end of any time period, and means operative if said sensing means are activated for delaying the production of the predict signal in the succeeding time period from the instant that it would ordinarily occur, so that the frequency of the interpolator pulses in the said succeeding time period may increase appreciably before being again decreased to said certain percentage.

26. The combination set forth in claim 25 further characterized in that said sensing and delaying means are effective for delaying the production of predict signals only in time periods which are not appreciably longer than said predetermined predict interval.

27. In a data processing system having an interpolator for producing different preselected numbers of output pulses at different frequencies in different successive time periods, the combination comprising means for selectively producing a predict signal normally a predetermined predict interval in advance of the expiration of any time period, means responsive to said predict signals for gradually decreasing the frequency of said pulses a predetermined percentage below their original value, and means responsive to the interpolator producing the preselected number of output pulses for causing said frequency to be increased to the original value; that improvement which comprises a normally open gate through which said predict signals pass to said frequency-decreasing means, means for closing said gate when the frequency of said pulses has been decreased to said certain percentage, and means responsive to the interpolator producing the preselected number of output pulses for reopening said gate after a time delay which extends into the succeeding time period.

28. The combination set forth in claim 27 further characterized in that said gate comprises a discharge device having a control electrode and is normally held open by a positively charged capacitor connected to said control electrode, said gate-closing means comprises a circuit having means for relatively quickly discharging said capacitor when said frequency decreasing means are actuated, and said delay gate-reopening means comprises a circuit for recharging said capacitor through a timing resistor when the interpolator has produced a preselected number of output pulses.

29. In a data processing system including a variable frequency source of recurring signals, an interpolator counter connected to receive said signals and count predetermined numbers thereof to measure off different nominal time periods, means for selectively producing a predict signal when any such time period is within a predetermined nominal predict interval of expiration, means responsive to said predict signals for smoothly reducing the frequency of said source, means responsive to said counter receiving one of said predetermined numbers of signals for smoothly increasing the frequency of said source back to its original value, said predict interval being approximately equal to the shortest of said time periods; the improvement which comprises, in combination, means for sensing if the frequency of said source has been lowered at the beginning of any time period, and means responsive to said sensing means for delaying the production of a predict signal in a succeeding time period if that time period is the shortest one, whereby said frequency may rise during the delay interval before being reduced, so that the stretching of the time period is reduced.

30. In a data processing system including an adjustable frequency source of recurring signals, an interpolator counter connected to receive said signals and having means to count different preselected numbers thereof during different successive counting cycles and to produce a transfer signal at the end of each cycle, means for selectively producing a predict signal when a predetermined percentage of any preselected number of signals has been received by the counter, means responsive to the predict signal for smoothly decreasing the frequency of said source from its original value to a certain lower value, means responsive to the transfer pulse following the predict signal for smoothly increasing the frequency of said source to said original value; that improvement comprising, in combination, a gate for transferring the predict signals to said frequency-decreasing means, means for closing said gate each time that said source frequency is reduced to said certain value during any counting cycle, and means responsive to a transfer pulse at the end of that cycle for causing said gate to re-open after a certain time delay from the instant of the transfer pulse so that said source frequency may rise during the early portion of the succeeding cycle.

31. The combination set forth in claim 30 further characterized in that said gate has a control terminal and is opened or closed respectively when a control signal applied to said terminal is above or below a predetermined value, means connected to said terminal for creating a control signal normally higher than said predetermined value, means for rapidly reducing said control signal below said predetermined value in response to initiation of said smooth reduction in said source frequency, and means responsive to a transfer pulse for causing said control signal to gradually increase to said higher value.

32. The combination set forth in claim 31 further characterized in that said control signal-creating means comprises capacitor connected to said terminal and normally charged to a voltage higher than said predetermined value, said reducing means comprises means for discharging said capacitor through a relatively low resistance, and said signal-increasing means comprises means to recharge said capacitor through a relatively high resistance.

References Cited in the file of this patent

UNITED STATES PATENTS

| | | |
|---|---|---|
| 2,902,658 | Erdman | Sept. 1, 1959 |
| 2,947,929 | Bower | Aug. 2, 1960 |
| 2,964,657 | Page | Dec. 13, 1960 |